(12) United States Patent
Kastenholz et al.

(10) Patent No.: US 6,980,543 B1
(45) Date of Patent: Dec. 27, 2005

(54) INTERCONNECT NETWORK FOR OPERATION WITHIN A COMMUNICATION NODE

(75) Inventors: Frank Kastenholz, Chelmsford, MA (US); Tom Westberg, Sudbury, MA (US); Steven R. Willis, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/336,090

(22) Filed: Jun. 18, 1999

Related U.S. Application Data

(60) Provisional application No. 60/090,028, filed on Jun. 19, 1998.

(51) Int. Cl.[7] ............................................. H04L 12/66
(52) U.S. Cl. ....................... 370/352; 370/386; 370/469
(58) Field of Search ........................ 370/24, 32.1, 58.3,
370/489, 419, 421, 312, 314, 465, 466, 469,
370/535, 537, 538, 540, 542, 543, 217, 218,
370/242, 244, 352, 386; 710/2, 300

(56) References Cited

U.S. PATENT DOCUMENTS

| 5,255,264 | A | * | 10/1993 | Cotton ........................ 370/24 |
|---|---|---|---|---|
| 5,729,546 | A | | 3/1998 | Gupta et al. .................. 370/56 |
| 5,740,156 | A | | 4/1998 | Tanabe et al. ................ 370/60 |
| 5,751,709 | A | * | 5/1998 | Rathnavelu ............. 370/395.4 |
| 5,920,705 | A | * | 7/1999 | Lyon et al. .................. 370/409 |
| 6,049,542 | A | * | 4/2000 | Prasad ......................... 370/386 |
| 6,052,364 | A | * | 4/2000 | Chalmers .................... 370/312 |
| 6,052,375 | A | * | 4/2000 | Bass et al. .................. 370/412 |
| 6,067,298 | A | * | 5/2000 | Shinohara ............. 370/395.71 |
| 6,122,251 | A | * | 9/2000 | Shinohara ................... 370/231 |
| 6,205,150 | B1 | * | 3/2001 | Ruszczyk ................... 370/412 |
| 6,219,728 | B1 | * | 4/2001 | Yin ............................. 370/229 |
| 6,272,151 | B1 | * | 8/2001 | Gupta ......................... 370/489 |
| 6,408,005 | B1 | * | 6/2002 | Fan et al. ................... 370/412 |

FOREIGN PATENT DOCUMENTS

| EP | 0797373 | 9/1997 |
|---|---|---|
| WO | WO 9403004 | 3/1994 |

* cited by examiner

*Primary Examiner*—Chi Pham
*Assistant Examiner*—Anh-Vu H Ly
(74) *Attorney, Agent, or Firm*—Harrity & Snyder, LLP

(57) ABSTRACT

An interconnect network for operation within communication node, wherein the interconnect network may have features including the ability to transfer a variety of communication protocols, scalable bandwidth and reduced down-time. According to one embodiment of the invention, the communication node includes a plurality of I/O channels for coupling information into and out of the node, and the interconnect network includes at least one local interconnect module having local transfer elements for transferring information between the plurality of I/O channels; and scaling elements for expanding the interconnect network to include additional local interconnect modules, such that information can be transferred between the local interconnect modules included in the interconnect network.

25 Claims, 12 Drawing Sheets

| Local Interconnect Chassis Port # | Expanded Interconnect (ASIC, Port #) | | |
|---|---|---|---|
| | For Interconnect Board 218 | For Interconnect Board 220 | For Interconnect Board 222 |
| 8a | 402a, 0 | 410a, 0 | 418a, 0 |
| 8b | 402b, 0 | 410b, 0 | 418b, 0 |
| 9a | 404a, 0 | 412a, 0 | 420a, 0 |
| 9b | 404b, 0 | 412b, 0 | 420b, 0 |
| 10a | 406a, 0 | 414a, 0 | 422a, 0 |
| 10b | 406b, 0 | 414b, 0 | 422b, 0 |
| 11a | 408a, 0 | 416a, 0 | 424a, 0 |
| 11b | 408b, 0 | 416b, 0 | 424b, 0 |
| 12a | 402a, 8 | 410a, 8 | 418a, 8 |
| 12b | 402b, 8 | 410b, 8 | 418b, 8 |
| 13a | 404a, 8 | 412a, 8 | 420a, 8 |
| 13b | 404b, 8 | 412b, 8 | 420b, 8 |
| 14a | 406a, 8 | 414a, 8 | 422a, 8 |
| 14b | 406b, 8 | 414b, 8 | 422b, 8 |
| 15a | 408a, 8 | 416a, 8 | 424a, 8 |
| 15b | 408b, 8 | 416b, 8 | 424b, 8 |

| Local Interconnect Chassis # | Expanded Interconnect Port #s |
|---|---|
| 118 | 0,8 |
| 120 | 1,9 |
| 122 | 2,10 |
| 124 | 3,11 |
| 126 | 4,12 |
| 128 | 5,13 |
| 130 | 6,14 |
| 132 | 7,15 |

*FIG. 7*

INTERCONNECT NETWORK FOR OPERATION WITHIN A COMMUNICATION NODE

RELATED APPLICATIONS

This application claims the benefit of priority under 35 U.S.C. 119(e) to U.S. Provisional Application Ser. No. 60/090,028, filed Jun. 19, 1998, and is related to U.S. patent application Ser. No. 09/237,128, filed Jan. 25, 1999, and entitled "NETWORK PACKET FORWARDING LOOKUP WITH A REDUCED NUMBER OF MEMORY ACCESSES," U.S. patent application Ser. No. 09/336,311, filed Jun. 18, 1999, and entitled "A QUALITY OF SERVICE FACILITY IN A DEVICE FOR PERFORMING IP FORWARDING AND ATM SWITCHING," U.S. patent application Ser. No. 09/336,229; filed Jun. 18, 1999, and entitled "DEVICE FOR PERFORMING IP FORWARDING AND ATM SWITCHING," and U.S. patent application Ser. No. 09/335,947, filed Jun. 18, 1999, and entitled "METHOD AND SYSTEM FOR ENCAPSULATING/DECAPSULATING DATA ON A PER CHANNEL BASIS IN HARDWARE". The entire contents of each of the applications are hereby incorporated by reference.

TECHNICAL FIELD

The invention relates generally to communication nodes, and more particularly to an interconnect network for operation within a communication node.

BACKGROUND OF THE INVENTION

Communication nodes, which act as junction points for communication signals transferred between a plurality of sources, are required to handle a variety of popular communication protocols, such as Integrated Services Digital Network (ISDN) protocol, Asynchronous Transfer Mode (ATM), and Internet Protocol (IP). ISDN, an early attempt at a multi-service architecture (i.e., an architecture capable of handling a variety of communication encapsulations), which is based on the telephone hierarchy, apportions bandwidth in 64 kilobits per second (Kbps) circuits. With local area networks (LANs) operating at 10 megabits per second (Mbps), ISDN has proved too slow. ATM is a packet switching protocol that was conceived as a transport mechanism for broadband ISDN. ATM transfers information in fixed-length packets called cells. The cells travel over virtual connections (VCs) between communication nodes that are established prior to each communication session. The combination of fixed cell formats and VCs renders ATM a faster alternative to ISDN. Additionally, ATM handles bursts of data traffic more efficiently than time division multiplexing (TDM) and provides high-quality voice and video support.

The popularity of the World Wide Web (WWW) has encouraged the use of IP. As a result, low-cost, distance-insensitive IP-based transport has become an attractive alternative to leased lines and frame relay (FR). Additionally, Internet Service Providers (ISPs) have become serious contenders for enterprise traffic.

Unfortunately, all of the information transfer protocols have drawbacks. Specifically, ISDN provides a relatively low-speed access solution. ATM supports frame relay, virtual private networks (VPNs), circuit emulation, private branch exchange (PBX) interconnects and quality of service (QoS), but does not mesh easily with existing data protocols. IP supports applications such as Internet Access and VPNs, for which cost connectivity is important. However, IP has yet to demonstrate industrial-strength reliability. As a result, full service providers find it necessary to maintain parallel switching networks. Because such parallel networks require maintenance and service of a variety of devices such as, voice switches, frame relay switches, ATM switches, routers, add/drop multiplexers, and digital cross-connects, they have a high associated capital equipment cost.

Conventional communication nodes also have a variety of drawbacks. For example, conventional communication nodes fail to provide sufficient ease of scalability. Typically, conventional switching nodes provide a switching/routing network having a fixed bandwidth. However, as enterprises grow, their needs also grow. But, the fixed bandwidth switching routing network of conventional technology requires enterprises to predict such growth and purchase systems having sufficiently large bandwidth up front; thereby compounding the challenge of maintaining parallel networks. Another drawback of conventional systems is reliability. Because conventional systems fail to provide a single switch/routing network that can operate on a variety of protocols, today's Giga Points-of-Presence (GigaPoPs) and Access PoPs are a complex and expensive aggregation of core routers connecting smaller Access PoPs to the core transport capacity. These structures are fragile, with frequent service outages due to performance limitations and equipment failures. Enterprises cannot afford to be exposed to significant down time due to failures or updates associated with conventional technology.

Because the switching/routing networks of conventional systems are typically designed to operate under the constraints of a particular protocol, they lack the flexibility to adapt to emerging technologies, employing new communication protocols. As discussed above, different protocols provide different QoS features. Thus, another drawback of a network operating under the constraints of a single protocol is that a service provider cannot offer varying grades of service to users having differing priority requirements; thus causing service providers to forego a potentially significant source of revenue.

Accordingly, in an aspect consistent with the principles of the invention, there is provided an interconnect network that enables a multi-service communication node to handle a variety of communication protocols, without requiring the maintenance of costly parallel networks.

In accordance with another aspect consistent with the principles of the invention, there is provided an interconnect network that enables a communication node to adapt to communication protocols employed by emerging technologies.

In accordance with yet another aspect consistent with the principles of the invention, there is provided a scalable interconnect network enabling bandwidth scaling of a communication node to fit the needs of providers having varying bandwidth requirements.

In accordance with a further aspect consistent with the principles of the invention, there is provided a fault-tolerant interconnect network capable of repair and update, without causing down-time or compromising operation of the communication node.

These and other aspects of the invention will be described with respect to the following description of the invention.

SUMMARY OF THE INVENTION

The invention is directed to communication nodes. More particularly, it is directed to interconnect networks in communication nodes. According to one embodiment of the invention, a communication node includes interconnect networks that enable the node to transfer a variety of communication protocols. According to a further embodiment, an interconnect network according to the invention enables a communication node to handle ATM and IP Packet-over-SONET protocols with the same hardware. An interconnect network according to an additional embodiment of the invention also enables a communication node to provide Frame Relay Data Terminal Equipment (DTE) and Multi-protocol Label Switching (MPLS) functionality. An interconnect network according to another embodiment of the invention enables a communication node to act as both a native ATM switch and a native IP router, operating at line speeds up to at least as high as 2.488 Gps (OC48c/STM16c).

According to additional features, the invention can provide improved reliability. By way of example, according to one embodiment, the invention provides Automatic Protection Switching (APS), wherein Open Systems Interconnection (OSI) Layer 2 and Layer 3 information is mirrored to provide rapid APS switchover. Additionally, system modules can be hot-swappable, and designed so that single component failures do not lead to total node failure.

According to another embodiment, the communication node is packaged in a scalable set of modules. OC48 line cards and Gigabit Ethernet modules populate a local communication interface module including a local interconnect network. An optional front end access module provides fan out to OC12/STM4, OC3/STM1, DS3, or E3 interfaces, and an optional expanded interconnect module, sometimes referred to as a hyperconnect fabric, allows dynamic bandwidth expansion of the communication node to include up to eight interconnected local interconnect modules, thereby providing 160 Gbs of essentially non-blocking bandwidth.

Yet another embodiment of the invention enables service providers to offer enterprises differing grades or quality of service (QoS).

Briefly described, an interconnect network according to one embodiment of the invention is incorporated in a communication node having a local communication interface, an associated local interconnect network, and scaling elements. The local communication interface includes a plurality of external communication channels for coupling information into and out of the node and a plurality of internal communication channels for transferring information within the node. Each external communication channel couples to an internal communication channel. The local interconnect network has local transfer elements for directing information between the internal communication channels, and consequently between the external communication channels. The scaling elements enable dynamically scaling the node to include additional local communication interfaces having additional associated local interconnect networks, such that information can be transferred between the local communication interfaces. According to a further feature, as the node expands to include additional local communication interfaces and local interconnect networks, the communication node, optionally, can transfer information between any of the internal communication channels, and thus any of the external communication channels, of the local communication interfaces.

Since an enhanced feature of the invention is dynamic bandwidth scalability, according to further embodiment, the communication node provides an additional local communication interface and an additional local interconnect network; and the scaling elements include an expanded interconnect network. The additional local communication interface has an additional plurality of external communication channels for coupling information in and out of the node, and an additional plurality of internal communication channels for transferring information within the node. The internal and external communication channels of the additional local communication interface couple to each other. The additional local interconnect network includes additional local transfer elements for directing information between the additional plurality of internal communication channels. The local interconnect network and the additional local interconnect network both include non-local transfer elements for directing information between the internal communication channels and the expanded interconnect network. The expanded interconnect network includes expanded transfer elements for directing information between the local interconnect networks, such that information, optionally, can be transferred between any of the internal communication channels of the local communication interfaces.

In another embodiment, the invention includes up to eight local communication interfaces, with associated local interconnect networks. According to the dynamic bandwidth scalability feature of the invention, the expanded interconnect network remains unchanged, regardless of the number of local communication interfaces, and provides the ability to transfer information between the internal communication channels. Such an embodiment provides an ease of bandwidth scalability absent from prior art technology. In a further embodiment, the communication node can be scaled to change the number of local communication interfaces, while the node is operating transferring information. In this way, a communication node, incorporating an interconnect network according to one embodiment of the invention, can more easily meet a service provider's varying bandwidth needs.

As mentioned above, the invention may provide enhanced QoS features. To provide such features, an interconnect network according to one embodiment of the invention can monitor the availability of communication channels. More particularly, the local interconnect network can include a plurality of transceivers for transferring information between the local transfer elements and the internal communication channels. Each transceiver couples to an associated internal communication channel, and has a corresponding availability status indicative of an availability of that communication channel for transferring information. The local interconnect network may also include a plurality of memory storage queues, having associated ones of the transceivers, and including memory for storing information to be transferred by an associated transceiver. The interconnect networks may further include control elements for setting the status corresponding to a particular internal communication channel to indicate unavailability for transferring information, in response to an associated memory queue reaching a selectable content level. In this way, the communication node lowers the likelihood of losing information or blocking transfer due to overloading a particular channel. Additionally, according to a further embodiment, the information coupled into the communication node is assigned a particular priority, and the interconnect networks optionally includes control elements for setting the status corresponding to a particular channel to indicate availability for receiving information having a particular priority, such as high, medium or low, in response to an associated memory queue reaching a selectable content level.

According to a related embodiment, the interconnect networks provides a back pressure signal to the internal communication channels, wherein the back pressure signal contains the availability status for each of the internal communication channels. A further enhancement of this feature utilizes communication bits, initially reserved for a destination address or handle, associated with a particular internal communication channel, to transfer the back pressure/availability status from a local interconnect network to an associated local communication interface.

According to another embodiment, the invention provides enhanced error correction. As a result the local interconnect network includes elements for generating a redundant version of information transferred from the local interconnect network to the local communication interface. If error detection elements detect an anomaly in transferred information, error correction elements can recover an error-free version of information from the redundant version. According to a further embodiment, the communication node includes control elements for deactivating those elements, be they line cards or interconnect elements, causing the detected anomalies. According to a related embodiment, the communication node provides improved fault-tolerance by deactivating failed line cards or interconnect elements, without compromising the speed with which information is transferred through the node. Additionally, to provide reduced downtime, the communication node generally, and the interconnects specifically, may also include circuit protection elements for enabling the hot replacement of failed components, while the communication node continues to transfer information.

In a related embodiment, the interconnect networks transfer information internally as information cells, wherein each cell includes groups of information words, and each group of information words is transferred by way of a different internal communication channel. The local interconnect network generates the redundant version by performing a bit-by-bit "exclusive or" operation on pairs of groups of information words, prior to the pair being transferred to the local communication interface. The local interconnect network also transfers the "exclusive or" version of the pair to the local communication interface. In response to a detected anomaly in either member of the pair, the local communication interface can reconstruct an error-free version of the anomalous member by performing an "exclusive or" operation between the non-anomalous member and the "exclusive or" version of the transferred pair.

One way to enhance the non-blocking feature of the invention and thus, the speed with which information can be transferred through the interconnect networks, is to avoid the need for re-ordering groups of information words into a complete cell, subsequent to transfer through an interconnect network. According to one embodiment, the invention employs "clumping" to avoid re-ordering and thus, enhance transfer speed. More specifically, the interconnect networks can include elements for "clumping" or combining a plurality of information cells, and for transferring those clumped cells substantially simultaneously. In a further enhancement, the interconnect networks also include elements for appending "dummy" cells to fill in a partial clump prior to the clump being transferred.

In a related embodiment, an interconnect network according to the invention implements the clumping feature by employing storage queues associated with the transceivers. The storage queues intermediately store groups of information words to be transferred. The interconnect networks can further include detection elements for detecting when groups of words of a plurality of information cells to be included in a clump are stored in a queue, and transfer elements for substantially simultaneously transferring the clumped information cells by coupling the groups of words to transceivers.

As the communication node expands to include additional local communication interfaces and associated local interconnect networks, it becomes increasingly important for the expanded interconnect network to select an efficient path through which information passes, thereby avoiding unnecessary delays. Accordingly, in a further embodiment, the invention provides a substantially non-blocking feature. According to the non-blocking feature, the expanded interconnect network can include a forwarding array for storing data indicative of an unblocked local path through the expanded interconnect network. The expanded interconnect network can use at least a portion of the destination address of a group of words of an information cell as a pointer into the forwarding array to select an unblocked path. In a further embodiment, the expanded interconnect network employs a plurality of forwarding arrays, each storing data indicative of a segment of an unblocked path through the expanded interconnect network. Further, the expanded interconnect network can use successive portions of the destination address as pointers into each of the forwarding arrays to select each segment of an unblocked path.

According to a further embodiment, the transfer elements of the local interconnect network and the transfer elements of the expanded interconnect network are essentially identical, and therefore, interchangeable. In such an embodiment, the transfer elements can include a mode selection feature for selecting whether the element is to be used in a local mode or in an expanded mode. Such a feature provides substantial cost savings over prior art systems.

In further aspects, the invention includes methods corresponding to the above described apparatus.

BRIEF DESCRIPTION OF THE DRAWINGS

The subject matter regarded as the invention is particularly pointed out and distinctly claimed in the concluding portion of the specification. However, the invention, both as to organization and method of practice, together with further objects and advantages thereof, may best be understood by reference to the following illustrative description taken in conjunction with the accompanying drawings in which like numerals refer to like elements.

FIG. 6 is a table detailing the communication channel connections between an exemplary local interconnect module and the expanded interconnect module;

FIG. 7 is a table further specifying the connection of communication channels between potential local interconnect modules and the expanded interconnect module;

DESCRIPTION OF ILLUSTRATED EMBODIMENTS

As briefly described above, the invention is directed to an interconnection network in a communication node. Communication nodes are junctions for transferring communication signals between a plurality of sources. As such, communication nodes may be required to interface with systems employing a variety of communication protocols and operating at differing information transfer speeds. Prior art systems typically require maintenance of a plurality of networks, each being capable of interfacing with a particular type of source. In contrast, a communication node, embodying features of an illustrative embodiment of the invention, can process information entering the node at a variety of speeds and formatted pursuant to a plurality of protocols. By way of example, information can enter and leave the communication node at OC48, OC12/STM4, OC3/STM1, DS3 and E3 speeds. Additionally, information can enter and leave the node in IP- or ATM-based formats.

Another feature of the invention is dynamic bandwidth scalability. A communication node employing interconnection networks according to an illustrative embodiment of the invention, employs a modular design. The modular design enables a service provider to change the number of communication channels by adding or subtracting physical proximately located modules to or from the communication node. According to one embodiment, the modules include a plurality of I/O interfaces coupled to an associated interconnection network. In a further embodiment of the invention, the communication node employs a two-level interconnection network modularity; a local level and an expanded level. More particularly, a plurality of local interconnection network modules, preferably proximately located with respect to each other, couple to an expanded interconnection network, also preferably located proximate to the local interconnection modules. By changing the number of local interconnection network modules that are "plugged-in" to the expanded interconnect module, a service provider can change the bandwidth of the communication node. Moreover, according to a further embodiment, a service provider can connect and unconnect local interconnect modules while the communication node is operating transferring information thus, providing dynamic bandwidth scalability.

Figure 1:
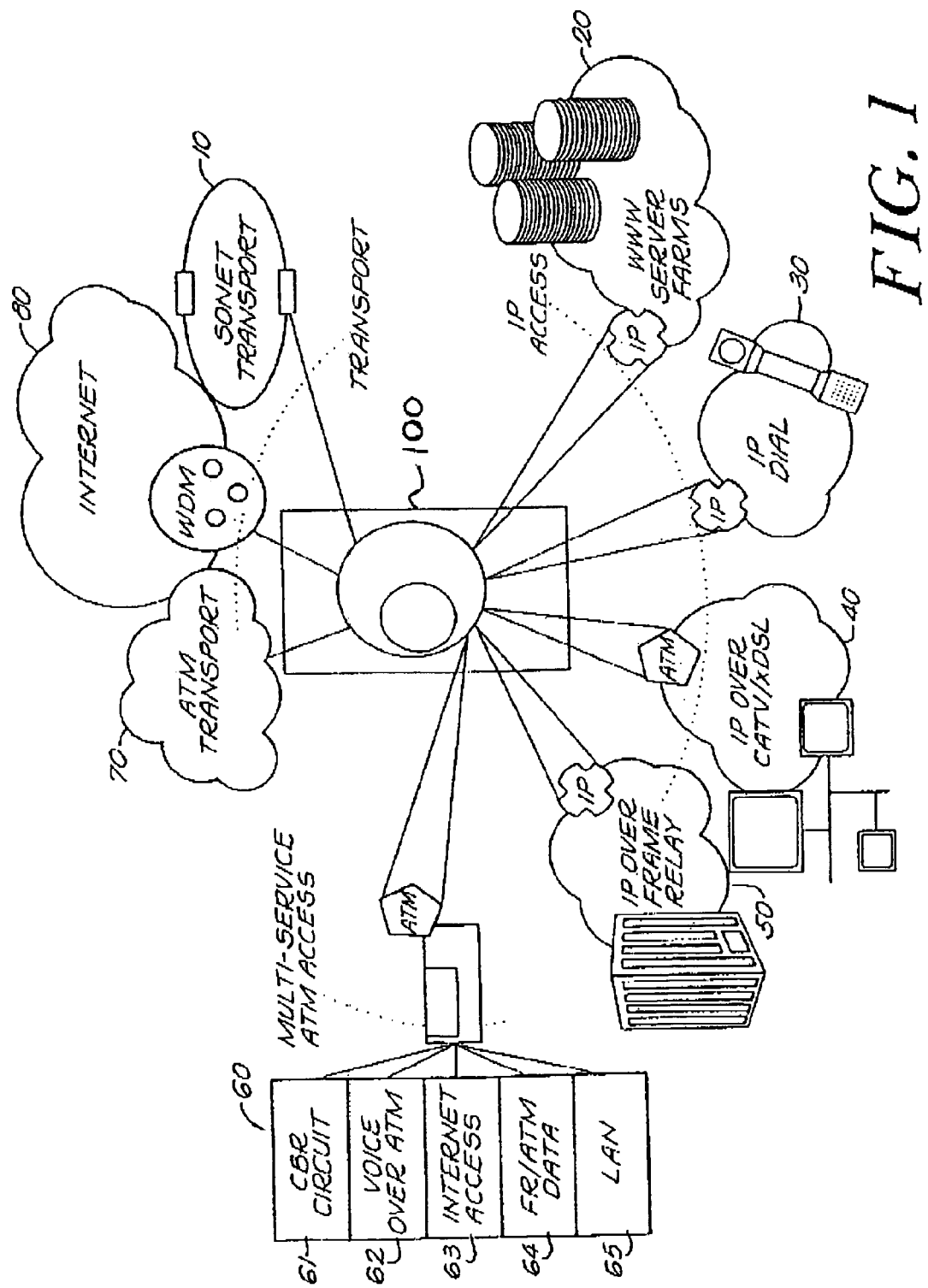
FIG. 1 depicts a plurality of communication networks interfacing through a communication node employing interconnection networks according to the invention.

FIG. 1 illustrates a typical deployment of a communication node 100 employing interconnection networks according to the invention. As shown, the communication node 100 can support, among other systems, SONET rings 10, WWW server farms 20, dial up IP systems 30, IP over CATV/xDSL systems 40, IP over FR networks 50, multi-service ATM networks 60, ATM transports 70, and internet WDM systems 80. Multi-service ATM access 60 can include CBR circuits 61, voice over ATM circuits 62, internet access 63, FR over ATM data 64, and LANs 65.

Figure 2:
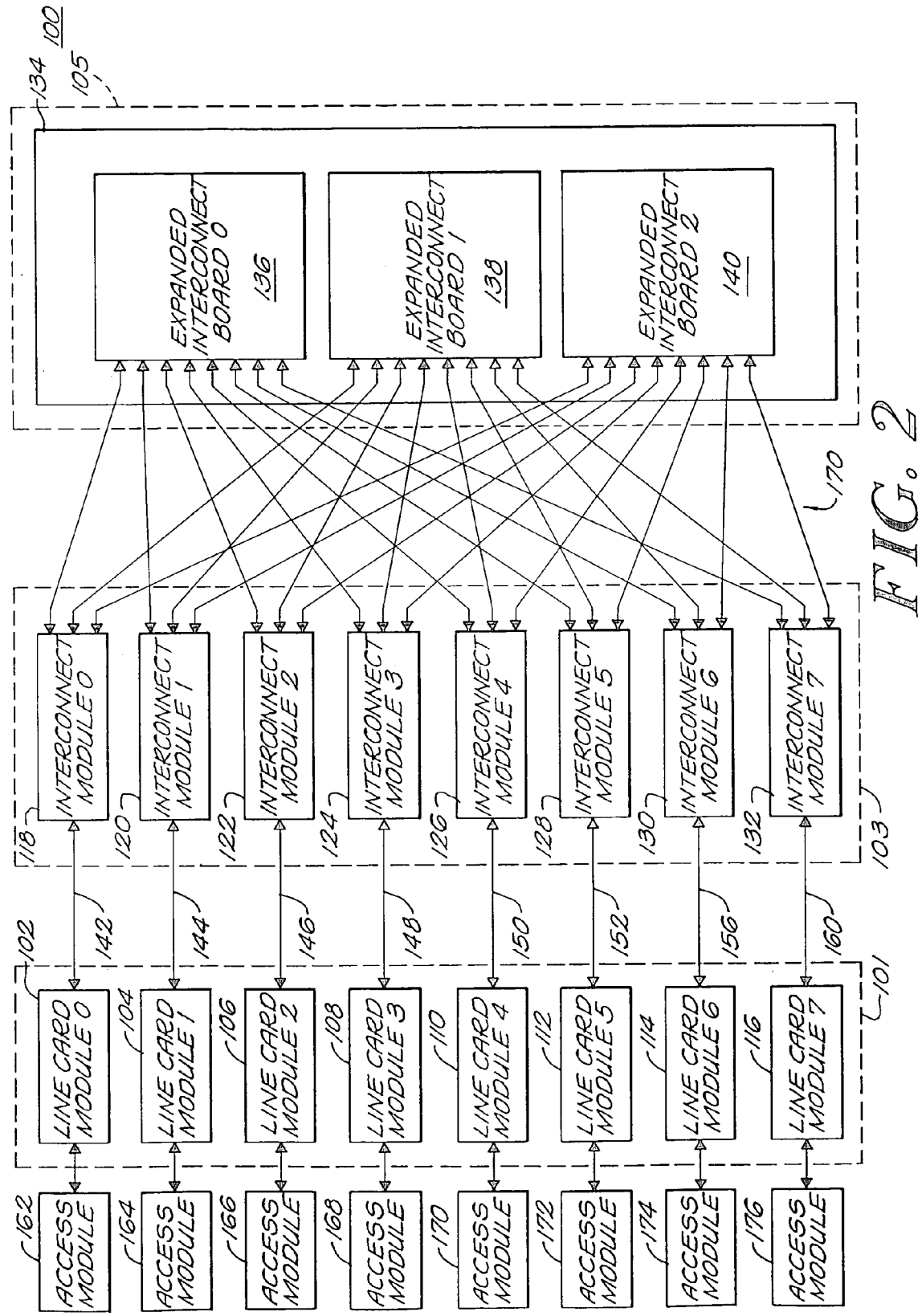
FIG. 2 is block diagram of a communication node of the type depicted in FIG. 1 and incorporating interconnect networks according to the invention.

FIG. 2 shows a block diagram of a communication node 100 incorporating interconnect networks according to an illustrative embodiment of the invention. The communication node 100 employs a two-level interconnect architecture. Accordingly, the node 100 includes one or more local line card modules 102–116, each having first-level associated local interconnect modules 118–132. In the case where the node 100 includes more than one local line card modules, the communication node 100 further includes a second-level expanded interconnect module 134, sometimes referred to as a hyperconnect fabric. The illustrated expanded interconnect module 134 includes three expanded interconnect boards 136–140. The boards are printed circuit boards holding integrated circuits and other components. According to one embodiment, the local line card modules 102–116 are essentially identical to each other. Similarly, the local interconnect modules 118–132 are also essentially identical to each other. Accordingly, for the most part, the following description focuses on an exemplary local line card module 102 and an exemplary local interconnect module 118; that description being equally applicable to the remaining local line card modules 104–116, and the remaining local interconnect modules 120–132.

The local line card module 102 transfers information into and out of the communication node 100, by way of a plurality of I/O interfaces. Those I/O interfaces can be, for example, IP or SONET/SDH ports that accept an OC48 data stream. For grooming to lower-speed interfaces, optional access modules 162–180 can be employed to provide OC12/STM4, OC3/STM1, DS3 and E3 ports. Access module 162 multiplexes input data streams into an OC48/STM16 uplink to local line card module 102. Line card module 102 couples information to an associated local interconnect module 118 by way of a plurality of Gigabit Ethernet connections 142. The local interconnect module 118 transfers information between the I/O channels of local line card module 102.

A feature of the local line card module 102 is that it supports a number of datalink layer encapsulations, implemented by a flexible encapsulation/decapsulation mechanism. The decapsulation mechanism is adaptable to accommodate emerging encapsulations. According to one embodiment, local line card module 102 supports IP over ATM over SONET/SDH; IP over PPP over SONET/SDH; IP over FR over SONET/SDH; IP over PPP over FR over SONET/SDH; IP over PPP over ATM over SONET/SDH; IP over MPLS over SONET/SDH; IP over SNAP 802.2; and IP over Ethernet 2.0. Line card module 102 also supports FRAME Relay DTE.

Those skilled in the art of communication nodes will appreciate that other encapsulations may be accommodated by the invention. The above list is intended to be illustrative, rather than limiting in nature.

A further feature of the illustrated communication node 100 is that it is dynamically bandwidth scalable. More particularly, according to one embodiment, the communication node 100 can include up to seven additional local line card modules 104–116, coupled to associated local interconnect modules 120–132 by way of Gigabit Ethernet connections 144–160. The expanded interconnect module 134 transfers information between local interconnect modules 118–132 by way of a plurality of Gigabit Ethernet connections 170. Each local interconnect module 118–132 is coupled to all three expanded interconnect boards 136–140. Another feature of the invention is that the same expanded interconnect module 134 can be employed for two local line card modules as is employed for additional local line card modules.

Figure 3:
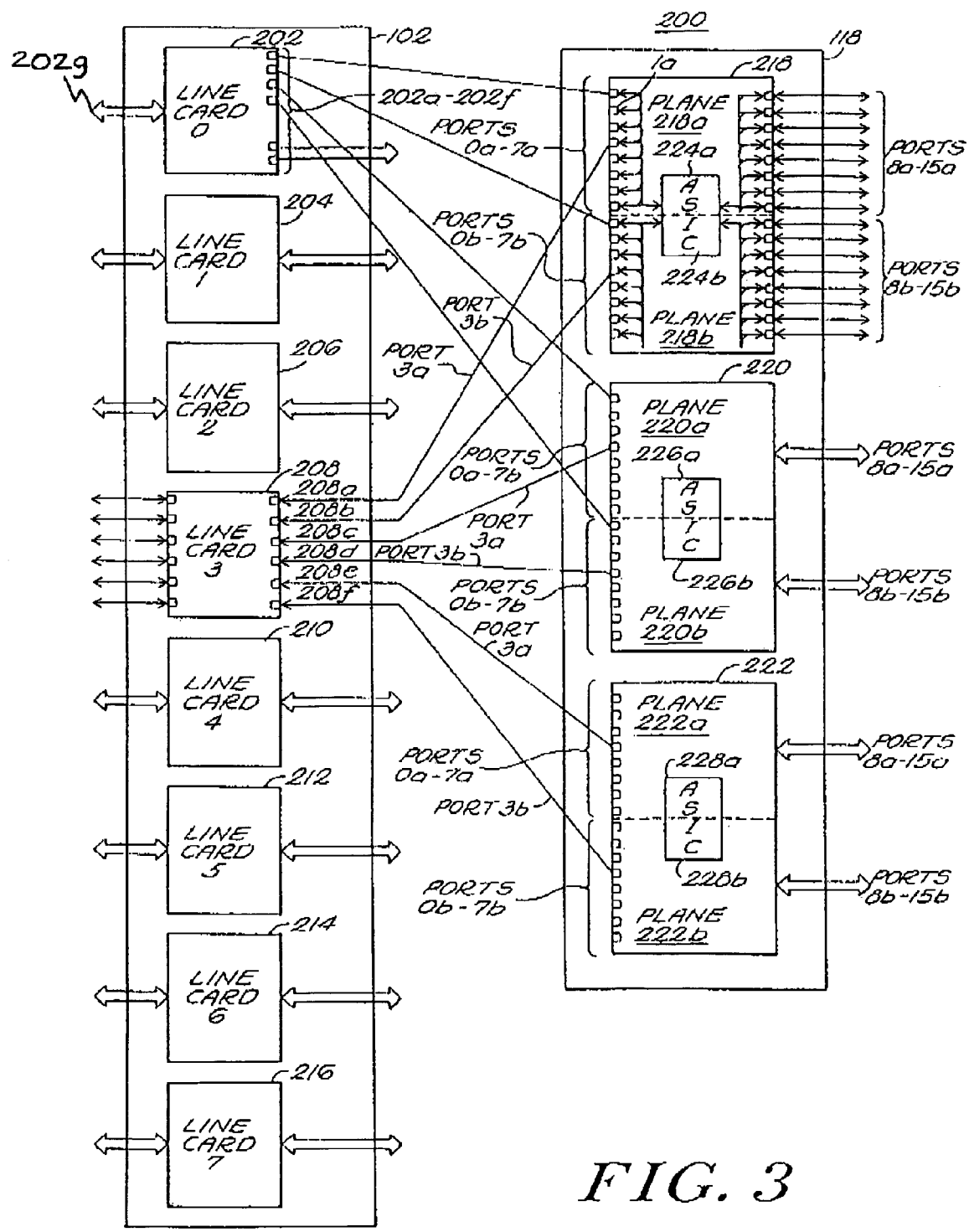
FIG. 3 is a more detailed interconnection diagram of an exemplary local line card module and local interconnect module of the type depicted in FIG. 2.

FIG. 3 is a more detailed schematic block diagram of an illustrative embodiment 200 of the communication node 100, but having only a single local line card module 102 coupled to a single local interconnect module 118. Since there is only a single local line card module 102, there is no need for the communication node 200 to include the second-level expanded interconnect module 134 of the type shown in FIG. 1.

The local line card module 102 includes eight local line cards 202–216. Local line cards 202–216 are printed circuit boards holding integrated circuits and other components. Each line card 202–216 has six internal (I/O) ports 202a–202f, and an external SONET I/O port 202g. Line card 202 couples information between external I/O port 202g and internal I/O ports 202a–202f External I/O port 202g couples information into and out of the node 200, and the internal I/O ports 202a–202f connect with up to forty-eight internal communication lines and couple information between the local line card module 102 and the local interconnect module 118. Typically, each internal I/O port a–f includes a Gigabit Ethernet transceiver, providing a Gigabit Ethernet input channel and a Gigabit Ethernet output channel. Preferably, the input and output channels provide 10-bits of information. However, it should be noted that the term transceiver, as used throughout this description, is also intended to encompass structures including separate receivers and transmitters. The external I/O port 202g is preferably software configurable for either SONET or SDH operation. Thus, physical interfaces are software configurable for OC48 or STM16. SONET and SDH PAMS may be freely intermixed within access module 142. A fully loaded local line card module 102 can have up to eight external SONET/SDH I/O ports and forty-eight corresponding internal I/O ports.

The local interconnect module 118 includes three identical interconnect boards 218–222. The interconnect boards 218–222 are printed circuit boards holding integrated circuits and other components. Each board 218–222 is logically subdivided into two essentially identical planes. By way of example, interconnect board 218 includes logical planes 218a and 218b; interconnect board 220 includes logical planes 220a and 220b; and interconnect board 222 includes logical planes 222a and 222b. The communication node 200 transfers information through the interconnect boards 218–222 by way of Application Specific Integrated Circuits (ASICs) 224–228. Each ASIC 224–228 logically includes an a-half and a b-half. The logical a-half services the logical a-plane of a particular interconnect board 218–222, while the logical b-half services the logical b-plane of the particular interconnect board 218–222. By way of example, ASIC 224a services logical plane 218a and ASIC 224b services logical plane 218b.

The illustrated embodiment of FIGS. 2 and 3 is described with respect to particular physical groupings of line cards 202–216 and local interconnect boards 218–222, and particular logical divisions of local interconnect planes 218a, 218b, 220a, 220b, 222a and 222c. However, as one skilled in the art will appreciate, the number of line card modules 102–116 and associated local interconnect modules 118–132 can be varied. Moreover, the number of local line cards included in a local line card module 102–116 can also be varied. Further, the number of local interconnect boards included in a local interconnect module 118 and the number of extended interconnect boards included in an extended interconnect module 134 can be varied. All logical divisions can also be varied.

With that caveat, according to the illustrated embodiment, each local interconnect board 218–222 includes sixteen internal communication ports (eight associated with each logical plane), and sixteen expanded communication ports (eight associated with each logical plane). As each interconnect board is essentially identical, board 218 will be discussed in detail. Boards 220 and 222 have a similar construction operation. Specifically, local interconnect board 218 has eight internal communication ports 0a–7a, associated with ASIC 224a, and eight internal communication ports 0b–7b, associated with ASIC 224b. Local interconnect board 218 also includes eight expanded communication ports 8a–15a, associated with ASIC 224a, and eight expanded communication ports 8b–15b, associated with ASIC 224b. Each internal and expanded communication port includes an Ethernet transceiver providing a Gigabit Ethernet input channel and a Gigabit Ethernet output channel. Each internal communication port 0a–7a and 0b–7b couples to an internal communication port a–f of a line card 202–216, and transfers information between the local line card module 102 and the local interconnect module 118. Similarly, each internal communication port a–f of line cards 202–216 couples to an internal communication port 0a–7a and 0b–7b of one of the interconnect boards 218–222.

Figure 4:
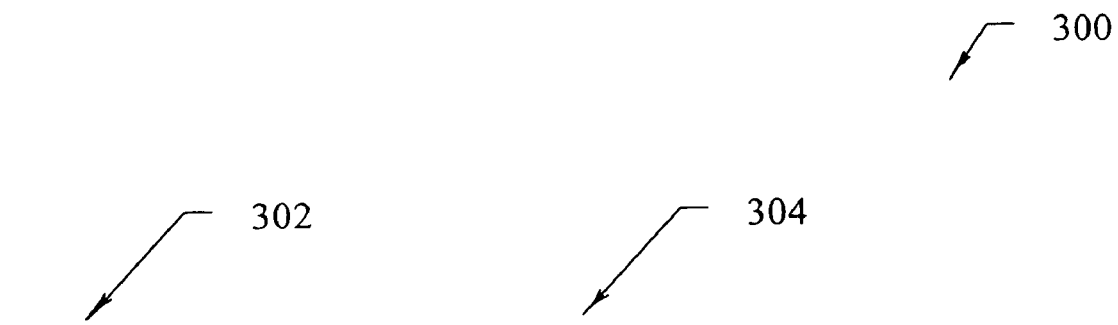
FIG. 4 is a table illustrative of the interconnections between a typical line card module and an interconnect module of the types depicted in FIGS. 2 and 3.

FIG. 4 shows a table 300 illustrative of the interconnections between the internal communication ports of line cards 202–216 and the internal communication ports of interconnect boards 218–222. Column 302 shows the line card designation numbers 202–216. Column 304 lists sets of ordered pairs in the form (interconnect plane #, port #), wherein those ordered pairs identify which internal port 0a–7a and 0b–7b of interconnect module 118 couples to each internal port a–f of line cards 202–216. By way of example, the first line of table 300 indicates that line card 202, internal port a, couples to internal port 0a of interconnect plane 218a. Similarly, internal ports b, c, d, e, and f of line card 202, couple to internal ports 0b of plane 218b, 0a of plane 220a, 0a of plane 220b, 0a of plane 222a, and 0b of plane 222b, respectively. In other words, the internal communication ports of line card 202 couple to the "zero numbered" ports of the interconnect planes 224a, 224b, 226a, 226b, 228a and 228b. In a similar fashion, the internal communication ports of line card 204 couple to the "one numbered" ports (e.g. 1a). Those of line card 206 couple to the "two numbered" ports (e.g. 2a). Those of line card 208 couple to the "three numbered" ports (e.g. 3a), and so on.

According to an illustrative embodiment, and as shown below in TABLE 1, the communication node 200 transfers information from the local interconnect module 118 to associated local line card module 102 in 64-byte cells.

As shown in TABLE 1, the 64-byte cell is subdivided into 16-byte groups. Logical plane 218a transfers 8-words of 2-bytes each. Logical planes 218b, 220a and 220b do the same. The two least significant bytes (LSBs) of the first and third 16-byte groups (i.e., the groups transferred by logical planes 218a and 220a) are used for the address/handle of a destination line card. The two LSBs of the second and fourth 16-byte groups (i.e., the groups transferred by logical planes 218b and 220b) are used for interconnect addressing and flow control information. Board 222 provides error correction and redundancy information. More particularly, logical plane 222a provides a bit-by-bit "exclusive or" (⊕) between the information transferred on logical plane 218a and logical plane 220a. Logical plane 222b provides a bit-by-bit "exclusive or" between the information transferred on logical plane 218b and logical plane 220b. In the illustrated embodiment of TABLE 1, a byte contains 8-bits and a word contains 2-bytes. However, those skilled in the art will appreciate that alternative byte and word conventions may be employed.

TABLE 1

| Plane | Word 7 | Word 6 | Word 5 | Word 4 | Word 3 | Word 2 | Word 1 | Word 0 |
|---|---|---|---|---|---|---|---|---|
| 218a | Data 7-0 | Data 6-0 | Data 5-0 | Data 4-0 | Data 3-0 | Data 2-0 | Data 1-0 | Dest. Adrs |
| 218b | Data 7-0a | Data 6-0a | Data 5-0a | Data 4-0a | Data 3-0a | Data 2-0a | Data 1-0a | Flow Control |
| 220a | Data 7-1 | Data 6-1 | Data 5-1 | Data 4-1 | Data 3-1 | Data 2-1 | Data 1-1 | Dest. Adrs |
| 220b | Data 7-1a | Data 6-1a | Data 5-1a | Data 4-1a | Data 3-1a | Data 2-1a | Data 1-1a | Flow Control |
| 222a | Data 7-0 $\oplus$ Data 7-1 | Data 6-0 $\oplus$ Data 6-1 | Data 5-0 $\oplus$ Data 5-1 | Data 4-0 $\oplus$ Data 4-1 | Data 3-0 $\oplus$ Data 3-1 | Data 2-0 $\oplus$ Data 2-1 | Data 1-0 $\oplus$ Data 1-0 | Dest Adrs |
| 222b | Data 7-0a $\oplus$ Data 7-1a | Data 6-0a $\oplus$ Data 6-1a | Data 5-0a $\oplus$ Data 5-1a | Data 4-0a $\oplus$ Data 4-1a | Data 3-0a $\oplus$ Data 3-1a | Data 2-0a $\oplus$ Data 2-1a | Data 1-0a $\oplus$ Data 1-0a | Flow Control |

With each line card 202–216 having six Gigabit internal Ethernet ports a–f, spread across three interconnect boards 218–222, and according to the format of TABLE 1, the six Gigabit internal Ethernet ports a–f provide 3-Gbs of usable bandwidth. More specifically, board 222 is not used for payload bandwidth, instead providing redundancy and error correction information, thus leaving 4-Gbs of bandwidth. 4-bytes out of sixty-four contained in a transferred cell (the LSBs of logical planes 218b and 220b) are used for interconnect addressing and flow control information, leaving 3.5 Gbs of bandwidth. And, 4-bytes out of the remaining fifty-six (the LSBs of logical planes 218a and 220a) are used by the line cards 202–216 as a destination handle/address, leaving 3 Gbs of bandwidth. This ensures that the communication node 200 can provide a sustained OC-48 (2.4 Gbs) transfer rate.

TABLE 2 below depicts a typical information cell format for information transferred from a line card 202–216 to local interconnect planes 218a, 218b, 220a, 220b, 222a and 222b.

As shown in the first column of TABLE 2 and as previously described with respect to TABLE 1, information is transferred in 8-word/16-byte groups. Each logical plane 218a, 218b, 220a and 220b receives a 16-byte group. Logical plane 222a receives the "exclusive or" of planes 218a and 220a, and logical plane 222b receives the "exclusive or" of logical planes 218b and 220b. Bytes 2–16 of logical planes 218a, 218b, 220a and 220b provide the transferred data.

"X" above represents an XOFF from the line card to the local interconnect 118. Information cells pass through the local interconnect 118 on separate planes 218a–222b, but with some discrepancies. By way of example, the a-planes contain the line card destination addresses. The b-planes allow for 14-bits of extra "payload" data carried through untouched. The payload byte above typically has its most significant bit (bit "P") set as parity for words 0 and 1 together. Even on plane 222a, the "P" bit covers the 15-bits which precede it, rather than the parity across planes 218a and 220a.

The line card destination address is an address or handle (global to the node 100 system wide) which specifies the destination line card (for unicast information) or line card set (for multicast information) to which the information cell is to be transferred.

TABLE 3 below depicts a preferred destination address format for locally transferred unicast information, while TABLE 4 depicts a preferred destination address format for locally transferred multicast information.

TABLE 3

| BYTE | 7 | 6 | 5 | 4 | 3 | 2 | 1 | 0 |
|---|---|---|---|---|---|---|---|---|
| 0 | APS | 0 | Line Card Module | | Line Card Designation | | | |
| 1 | P | 0 | 0 | 0 | 0 | 0 | 1 | Pri |
| 2–15 | Cell Data | | | | | | | |

TABLE 2

| Byte | Plane 218a | Plane 218b | Plane 220a | Plane 220b | Plane 222a | Plane 222b |
|---|---|---|---|---|---|---|
| 0 | DestLo | 0          X | DestLo | 0          X | DestLo | 0          X |
| 1 | DestHi | P  Payload | DestHi | P  Payload | DestHi | P  Payload |
| 2 | Data0 | Data1 | Data2 | Data 3 | 218a $\oplus$ 220a | 218b $\oplus$ 220b |
| 3 | Data4 | Data5 | Data6 | Data7 | 218a $\oplus$ 220a | 218b $\oplus$ 220b |
| . | . | . | . | . | . | . |
| . | . | . | . | . | . | . |
| . | . | . | . | . | . | . |
| 15 | Data52 | Data53 | Data54 | Data55 | 218a $\oplus$ 220a | 218b $\oplus$ 220b |

TABLE 4

| BYTE | 7 | 6 | 5 | 4 | 3 | 2 | 1 | 0 |
|------|---|---|---|---|---|---|---|---|
| 0 | | | Least-Significant 8 bits of MulticastID | | | | | |
| 1 | P | 1 | Most-Significant 6 bits of Mcast ID | | | | | |
| 2–15 | | | Cell Data | | | | | |

Byte-0 of TABLE 3 provides an "APS" bit, a Line Card Module designation field and a Line Card designation field. As shown in FIG. 3, according to the illustrated embodiment, there are eight potential destination line cards 202–216. Each one is assigned a 3-bit code 000–111. Bits 3, 4 and 5 of byte-0 of TABLE 3 provide this code. As shown in FIG. 2, a communication node 100, according to the illustrated embodiment, has eight potential line card modules 102–116. Each line card module 102–116 is assigned a 3-bit code 000–111. Bits 0, 1 and 2 of byte-0 of TABLE 3 provide this code. Bytes 2–15 provide the transferred data. The "P" bit provides parity across byte 1.

According to a preferred embodiment, unicast information cells travelling to a single destination line card have the "Pri" bit of TABLE 3 set to one for high-priority traffic. If the "APS" bit of TABLE 1 is set, the cell is sent to both the designated line card (n) and the (n+1) line card.

Figure 8:
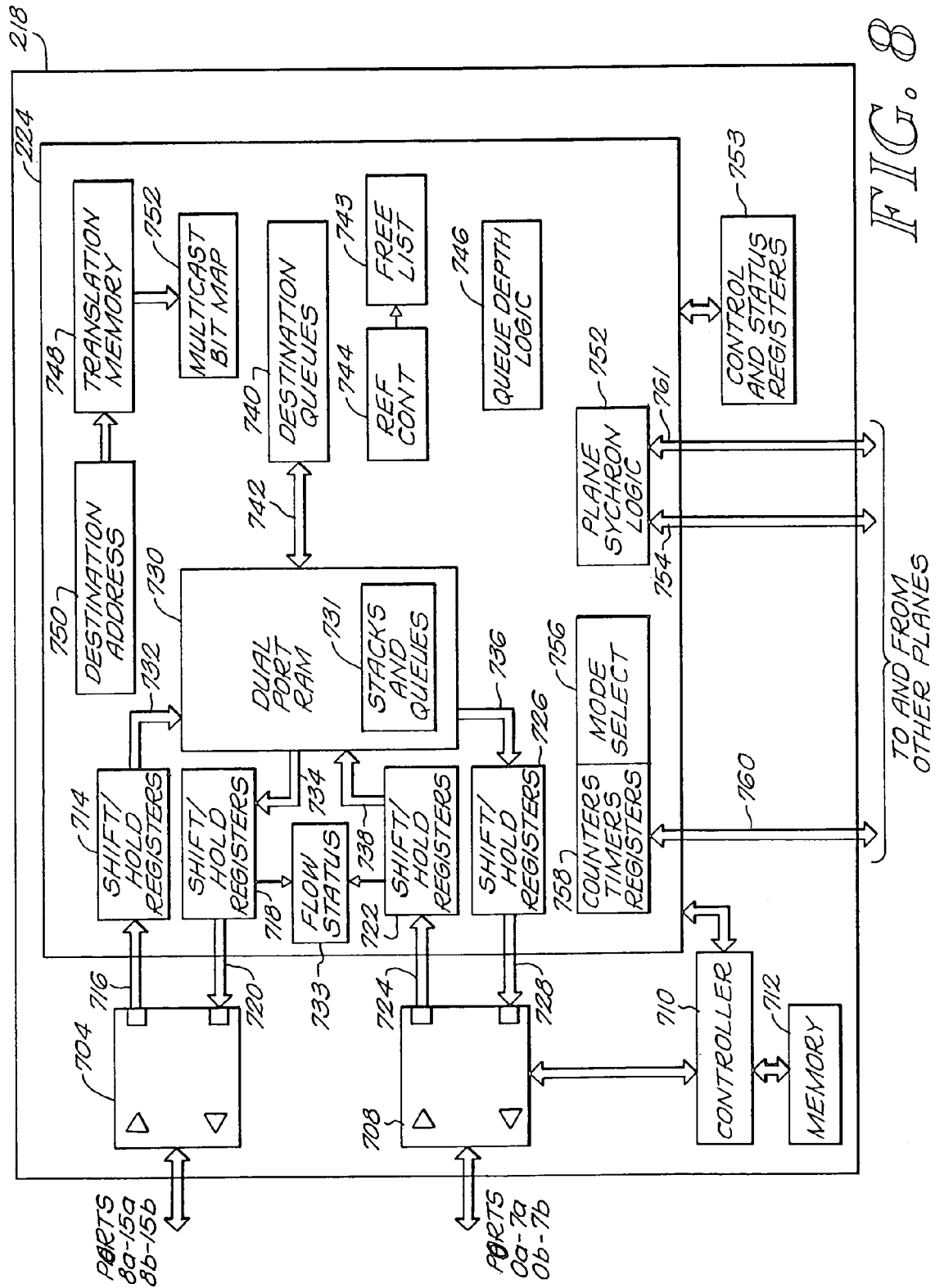
FIG. 8 is a functional block diagram of a local interconnect logical plane of the type depicted in FIG. 3.

With reference to TABLE 4, the multicastID is an address into a 16 k×9-bit RAM 748 of FIG. 8. This 14-bit address retrieves a 9-bit value. The least significant 8-bits are a mask with each bit representing a line card 202–216. The most significant bit represents priority; set to a logical one for high priority or a logical zero for low priority. If the node includes more than one local line card chassis 102, then each bit of the 8-bit mask represents a particular local line card chassis.

In operation, and as illustrated in TABLE 1 above, the communication node 200 transfers each 16-byte group over a different internal communication channel. By way of example and referring again to FIG. 3, assume each line card 202–216 has an associated address, and information enters line card 202 by way of external port 202g. Assume further that the entering information has a destination address of line card 208. As shown in FIG. 2, internal port 202a couples a first 16-byte group to internal port 0a of interconnect board 218. Internal port 202b couples a second 16-byte group to internal port 0b of board 218. Internal port 202c couples a third 16-byte group to internal port 0a of board 220, and internal port 202d couples a fourth 16-byte group to internal port 0b of board 220. Internal port 0a of board 218 couples the first 16-byte group to ASIC 224a. Internal port 0b of board 218 couples the second 16-byte group to ASIC 224b. Internal port 0a of board 220 couples the third 16-byte group to ASIC 226a, and internal port 0b of board 0b couples the fourth 16-byte group to ASIC 226b.

ASIC 224a processes the line card destination address and directs the first 16-byte group to internal port 3a of board 218. ASIC 224b processes the line card destination address and directs the second 16-byte group to internal port 3b of board 218. ASIC 226a processes the line card destination address and directs third 16-byte group to internal port 3a of board 220. ASIC 226b processes the line card destination address and directs the fourth 16-byte group to internal port 3b of board 220. Board 222 generates a bit-by-bit "exclusive or" between the first and third groups, and between the second and fourth groups. ASIC 228a processes the line card destination address and directs the "exclusive or" combination of the first and third groups to internal communication port 3a of board 222, and ASIC 228b processes the line card destination address and directs the "exclusive or" combination of the second and fourth groups to the internal communication port 3b of board 222. Board 222 in turn couples the first, second, third and fourth groups to destination line card 208, internal ports 208a–208d, respectively. Similarly, board 222 couples the "exclusive or" version of the groups of bytes to internal ports 208e and 208f. Destination line card 208 then performs various types of error checking, such as plain parity, 8B10B disparity and CRC across multiple cells. If line card 208 detects a bad character error, software can alert the line card to use the "exclusive or" version to retrieve an error-free version of the transferred information.

According to a further embodiment, the line card module 102 can determine whether a detected error is due to a failed line card 202–216 or a failed interconnect board 218–222. In the case where the error is due to a failed line card, the interconnect module removes that card from operation. In the case where the detected error is due to a failed interconnect card 218–222, the line card detecting the error can signal the error prone interconnect board 218–222 to take itself off line. So as not to compromise bandwidth, interconnect board 222 can automatically take the place of either interconnect board 218 or 220, until the failed board is replaced. According to a further feature, the failed board can be hot-swapped.

As discussed above, a feature of the invention is that according to a preferred embodiment, the communication node 100 is dynamically bandwidth scalable to include additional line card modules 104–116, having additional associated local interconnect chassis 120–160. According to a preferred embodiment, the modular construction of the line card modules 102–116, along with the modular construction of the local interconnect modules 118–132, in combination with the expanded interconnect module 134 provides the scalable feature. More specifically, as indicated in FIG. 2, according to the illustrated embodiment 100, a first mechanical chassis 101 houses up to eight local line card modules 102–116. Similarly, a second mechanical chassis 103 houses up to eight local interconnect modules 118–132. Further, a third mechanical chassis 105 houses the extended interconnect network 134. The first mechanical chassis 101 electrically couples to the second mechanical chassis 103 by way of communication channels 142–160. The second mechanical chassis 103 electrically couples to the third mechanical module 105 by way of communication channels 170. The communication node 100 employs connectors designed for "hot-swapping" at module interfaces. Those connectors enable the local line card modules 102–116, the local interconnect modules 118–132, and the expanded interconnect boards 136–140 to be connected and unconnected (i.e., "hot-swapped") from their respective mechanical chassis 101, 103 and 105, while the communication node 100 is powered and operating transferring information. Thus, as a service provider requires additional bandwidth, additional local line card modules 102–116, with associate additional local interconnect modules 118–132 can be "plugged in" to chassis 101 and 103, respectively.

Figure 5:
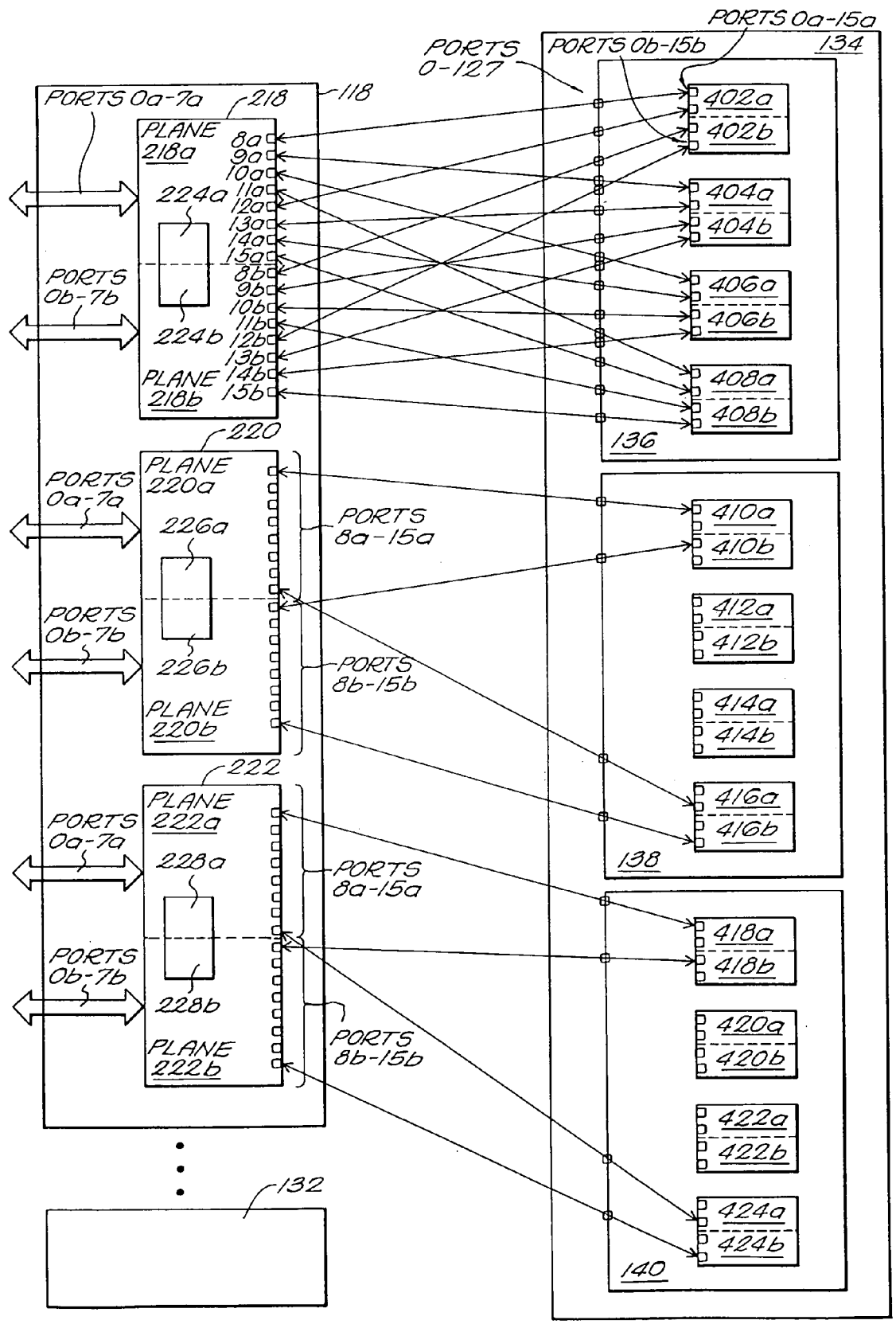
FIG. 5 is a more detailed block diagram showing interconnections between an exemplary local interconnect module and an expanded interconnect module of the types depicted in FIG. 2.

FIG. 5 is a more detailed schematic block diagram 400 showing interconnections between an exemplary local interconnect module 118 and an expanded interconnect module 134. The embodiment of FIG. 4 is illustrative of the dynamic bandwidth scalability of the communication node 100. As mentioned above, the local interconnect module 118 is essentially identical to optional local interconnect modules 120–132. Accordingly, the following illustrative description focuses on the interconnections between local interconnect module 118 and expanded interconnect module 134. However, each additional local interconnect module 120–132 interfaces to expanded interconnect module 134 in a like manner.

As shown in FIG. 5, and as discussed in more detail with regard to FIG. 3, the local interconnect module 118 includes three interconnect boards 218–222. Each board 218–222 logically subdivides into an a-plane and a b-plane. The a-plane and the b-plane are essentially identical and share an ASIC, which is also logically subdivided into an a-half and a b-half. Each ASIC 224–222 provides, among other functions, routing and switching between the internal communication channels associated with the particular interconnect board 218–222. According to the illustrated embodiment, each ASIC 224–226 may also provides storage queues, a control processor, control registers and status registers. It also controls Gigabit Ethernet I/O interfaces included on each interconnect board 218–222. The ASICs 224–228 further provide one or more pointer queues for storing information indicative of a substantially non-blocked path through its switching/routing circuitry.

Each local interconnect board 218–222 includes sixteen internal I/O ports 0a–7a and 0b–7b. The internal I/O ports 0a–7a and 0b–7b provide Gigabit Ethernet interfaces. As shown in FIG. 3, those Gigabit interfaces couple to the internal communication channels of an associated local line card module 102. Each local interconnect board 218–222 also provides sixteen expanded I/O ports 8a–15a and 8b–15b. Each expanded I/O port 8a–15a and 8b–15b provides a Gigabit input channel and a Gigabit output channel. The expanded I/O ports 8a–15a and 8b–15b couple information between the local interconnect module 118 and the expanded interconnect module 134.

The expanded interconnect module 134 includes three essentially identical expanded interconnect boards 136–140. Each board 136–140 includes, among other components, one hundred and twenty-eight Gigabit Ethernet transceivers. Each board 136–140 also includes four ASICs 402–408, 410–416, and 418–424, respectively. ASICs 402–424 are essentially identical to ASICs 224–228. However, ASICs 402–424 are mode selected to operate in an expanded interconnect mode, rather than the local interconnect mode of ASICs 224–228. As in the case of ASICs 224–228, ASICs 402–424 each logically subdivides into an a-half and a b-half Each half includes sixteen Gigabit Ethernet I/O ports, wherein each port includes a Gigabit input channel and a Gigabit output channel. Each of the sixteen Gigabit Ethernet ports couple to a Gigabit transceiver on the extended interconnect board.

By way of a specific example, board 136 of FIG. 5 includes ASICs 402–408. ASIC 402 is subdivided into two logical halves 402a and 402b. Similarly, ASIC 404 is subdivided into logical halves 404a and 404b; ASIC 406 is subdivided into logical halves 406a and 406b; and ASIC 408 is subdivided into logical halves 408a and 408b. ASIC 402 includes Gigabit Ethernet ports 0a–15a, on half 402a, and 0b–15b on half 402b. Ports 0a–15a couple to transceivers 0–15 on board 136, and ports 0b–15b couple to transceivers 16–31. Gigabit ports 0a–15a and 0b–15b of ASICs 404–408 successively couple to remaining transceivers 32–127. Gigabit I/O ports of ASICs 410–416 and 418–424 couple to one hundred and twenty-eight transceivers of boards 138 and 140, respectively, in an identical fashion to that described with respect to ASICs 402–404 on board 136.

FIG. 6 is a table 500 illustrating the communication paths between local interconnect module 118 and expanded interconnect module 134. Column 502 specifies the local interconnect port designation. Column 504 specifies the communication paths between local interconnect board 218 and expanded interconnect 134. Similarly, column 506 specifies the communication paths between local interconnect board 220 and expanded interconnect 134; and column 508 specifies the communication paths between local interconnect board 222 and expanded interconnect 134. As can be seen from FIGS. 4 and 5, the communication channels of board 218 couple to board 136. Those of board 220 couple to board 138, and those of board 222 couple to board 140. As also can be seen from FIG. 5, the I/O interfaces from local interconnect module 118 couple to the zero and eight ports of ASICs 402–424.

FIG. 7 is a table 600 depicting the expanded interconnect port assignments for each of the potential local interconnect modules 118–132 of FIG. 1. Column 602 identifies the particular local interconnect modules 118–132. Column 604 identifies the port assignments for the extended interconnect module 134. As shown, local interconnect module 120 couples to the one and nine ports; module 122 couples to the two and ten ports; module 124 couples to the three and eleven ports; module 126 couples to the four and twelve ports; module 128 couples to the five and thirteen ports; module 130 couples to the six and fourteen ports; and module 132 couples to the seven and fifteen ports.

TABLE 5 below specifies a preferred format for the destination address for unicast information transferred from a local interconnect modules 118–132 to the expanded interconnect module 134. Similarly, TABLE 6 specifies a preferred format for the destination address for multicast information transferred from a local interconnect modules 118–132 to the expanded interconnect module 134.

TABLE 5

| DestHi | | | | | | | | DestLo | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| P | 0 | Valid | Clump | 0 | 0 | 1 | Pri | APS | 0 | Module | | Card | | | |

Referring to TABLE 5, bit 7 of the most significant byte (MSB) is the parity bit, which represents parity across the previous 15-bits of the destination address. Bit 5 is the "Valid" bit. The "Valid" bit is set if the destination address is valid. Bit 4 is the "Clump" bit. The "Clump" bit is set if there is a valid combination or clump of cells. Clumping is a feature of the invention employed for eliminating the need for reordering transferred information subsequent to transfer. As discussed in further detail below, with reference to FIG. 7. Bit 7 is the "Pri" bit. The "Pri" bit is set to one for high-priority traffic. Bit 7 of the LSB is the "APS" bit. The "APS" bit is simply passed through the expanded interconnect 134 to local interconnects 118–132. Bits 3–5 of the LSB provide the 3-bit designation 000–111 for the destination line card module. Bits 0–3 of the LSB provide the 3-bit designation 000–111 for the particular line card.

TABLE 6

| DestHi | | | | | | | | DestLo | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| P | 1 | | | | | | | MulticastID (not 0 × 3FFF) | | | | | | | |

Preferably, the "Multicast ID" of TABLE 6 is passed on to the expanded interconnect module 134 to be translated. If the payload data portion of the cell is 0x3FFF, the information cell is considered to be invalid.

TABLES 7 and 8 depict a preferred format for unicast and multicast destination addresses, respectively, for information cells transferred from the expanded interconnect module 134 to a local interconnect modules 118–132. As described above, the "P" bit provides parity across the destination address. The "Valid" bit is set if the destination address is valid. The "Pri" bit is set for high-priority traffic. The "APS" bit is set if the cell is to be sent to both the designated line card (n), and the (n+1) line card. Bits 0–3 provide the designation code for the line card to which the cell is sent.

TABLE 7

| DestHi | | | | | | | | DestLo | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| P | 0 | Valid | | | | | | Pri | APS | | | Card | | | |

TABLE 8

| DestHi | | | | | | | | DestLo | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| P | 1 | | | | | | | MulticastID (not 0 × 3FFF) | | | | | | | |

FIG. 8 is a functional block diagram of an illustrative local interconnect board of FIG. 5. The board 218 includes an ASIC 224 of the type employed in the local interconnect module 1118. Preferably, ASIC 224 is identical to ASICs 402–424 employed in the expanded interconnect module 134. As all of the local interconnect boards are preferably identical, for the purpose of the following discussion it is assumed that board 218 is an exemplary local interconnect board of local interconnect module 118, and interfaces with local line card module 102 of FIG. 2. However, those of ordinary skill in the art will appreciate that the ASIC 224 need not be identical to ASICs 404–424.

As shown in FIG. 8, the interconnect board 218 includes Gigabit transceiver sets 704 and 708, memory elements 710, controller 712 and status and control registers 714. Gigabit transceiver set 708 provides Gigabit I/O ports 0a–7a and 0b–7b, which couple to the internal communication channels of a local line card module 102 of FIG. 3. Gigabit transceiver set 704 provides Gigabit I/O ports 8a–15a and 8b–15b, which couple to the expanded communication channels of the expanded interconnect module 134, shown in FIG. 5.

Each transceiver of sets 704 and 708 couples to the ASIC 224 by way of associated input and output shift and hold registers. More specifically, transceivers of set 704 couple to input shift and hold registers 714 by way of lines 716 and output shift and hold registers 718 by way of lines 720. Transceivers of set 704 couple to input shift and hold registers 722 by way of lines 724, and output shift and hold registers 726 by way of lines 728.

The ASIC 224 also includes a dual-port RAM 730 for storing various stacks and queues 731 associated with flow control information. Flow status 733 stores an availability status, regarding the availability of a particular line card to receive information. RAM 730 intermediately stores information being transferred through the board 218. Shift and hold registers 714 and 716 couple to the dual-port RAM 730 by way of lines 732 and 734, respectively. Shift and hold registers 722 and 726 couple to the dual-port RAM 730 by way of lines 736 and 738. The dual-port RAM 730 also couples to destination stack 740 by way of lines 742. The ninety-six destination queues 740 intermediately store addresses representative of where particular data is stored in RAM 730. The queues 740, preferably employ a plurality of stacks for ease of addressing. However, other storage structures can be employed.

As discussed above in the Summary of the Invention, and as discussed in further detail below, according to a preferred embodiment, the invention employs a plurality of memory storage queues/buffers to aid in the efficient transfer of information. It should be noted that the terms queue and buffer are used interchangeably. The dual-port RAM 730 provides an output queue for each transceiver of sets 704 and 708. More specifically, information cells coupled into board 218 to be transferred to a line card 202–204 of local interconnect 102, are first written into buffer memory at an address which is written into an output queue. Free list memory 742 provides a list of available buffer memory addresses. There is a reference counter 744 for each of the 1536 buffers in the dual port RAM 730. Reference counter 744 contains the number of output queues to which the contents of the respective buffers are to be sent. A reference counter 744 decrements in response to information being read from an associated buffer. When the reference counter reaches zero, the address of the buffer is returned to free list 743. In this way, the ASIC 224 can track the available buffer locations associated with each transceiver. Information written to buffer memory is subsequently transferred to one of the output shift and hold registers 720 or 728, and held there until an internal time slot arrives in which the destination address lookup can be performed, the read from the free list memory 742 can be performed, the write to the buffer memory can be performed, and the write to the output queue can be performed.

Figure 9A:
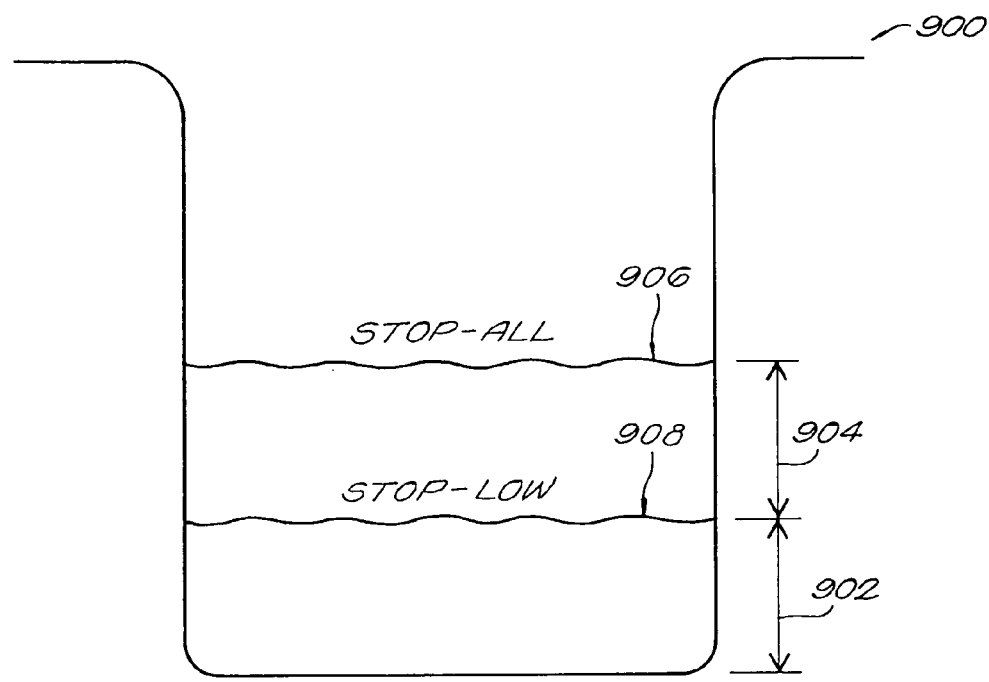
FIGS. 9A and 9B are conceptual illustrations of high- and low-priority queues.

According to a preferred embodiment, the invention provides enhanced QoS features. To that end, queues 731 can include QoS queues. The QoS queues, such as those conceptually illustrated in FIGS. 9A and 9B, can have multiple watermark levels; those levels corresponding to differing priorities. By way of example, high-priority queue 900 of FIG. 9A can have two watermarks 906 and 908. In range 902, queue 900 reports its status as "stop-none," indicating the I/O channel associated with queue 900 is ready to receive information of any priority. As depicted in the flow-chart of FIG. 10A, during operation, in range 904, queue 900 reports its status as "stop-low" 1002, indicating the I/O channel associated with queue 900 is ready to receive information having a "medium" priority or higher, as indicated at 1004. When the queue 900 is filled up to level 906, it reports its status as "stop-all," as shown at 1006. As shown at 1008, this indicates that its associated I/O channel is unavailable. If the "Stop-Low" watermark 908 of queue 900 has not been reached, as indicated at 1006, it is available to receive information of any priority.

Figure 9B:
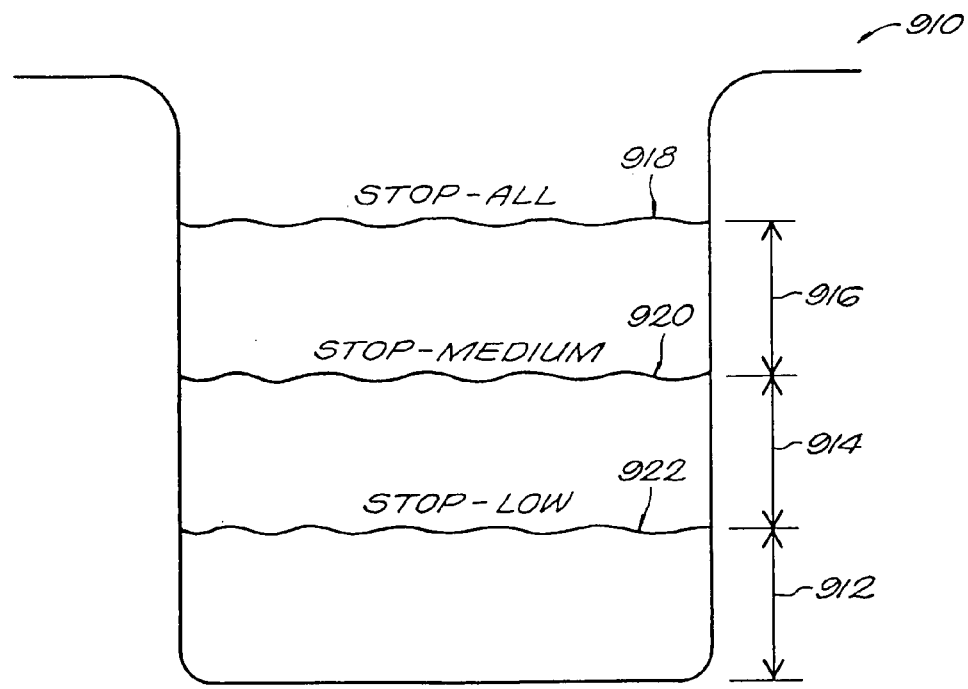
Figure 10A:
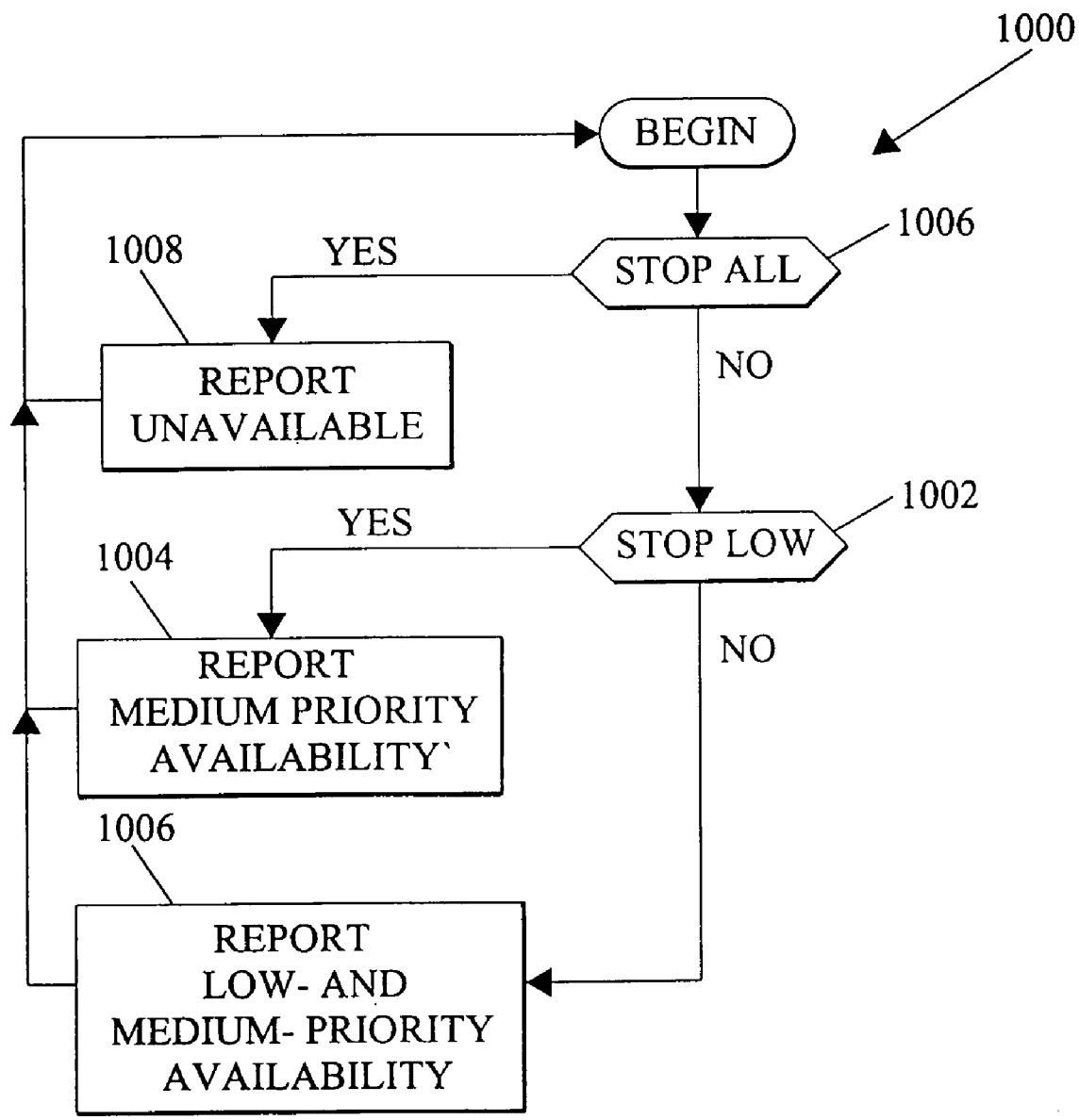
FIGS. 10A and 10B are flow-charts depicting the operation of the queues of FIGS. 9A and 9B.
Figure 10B:
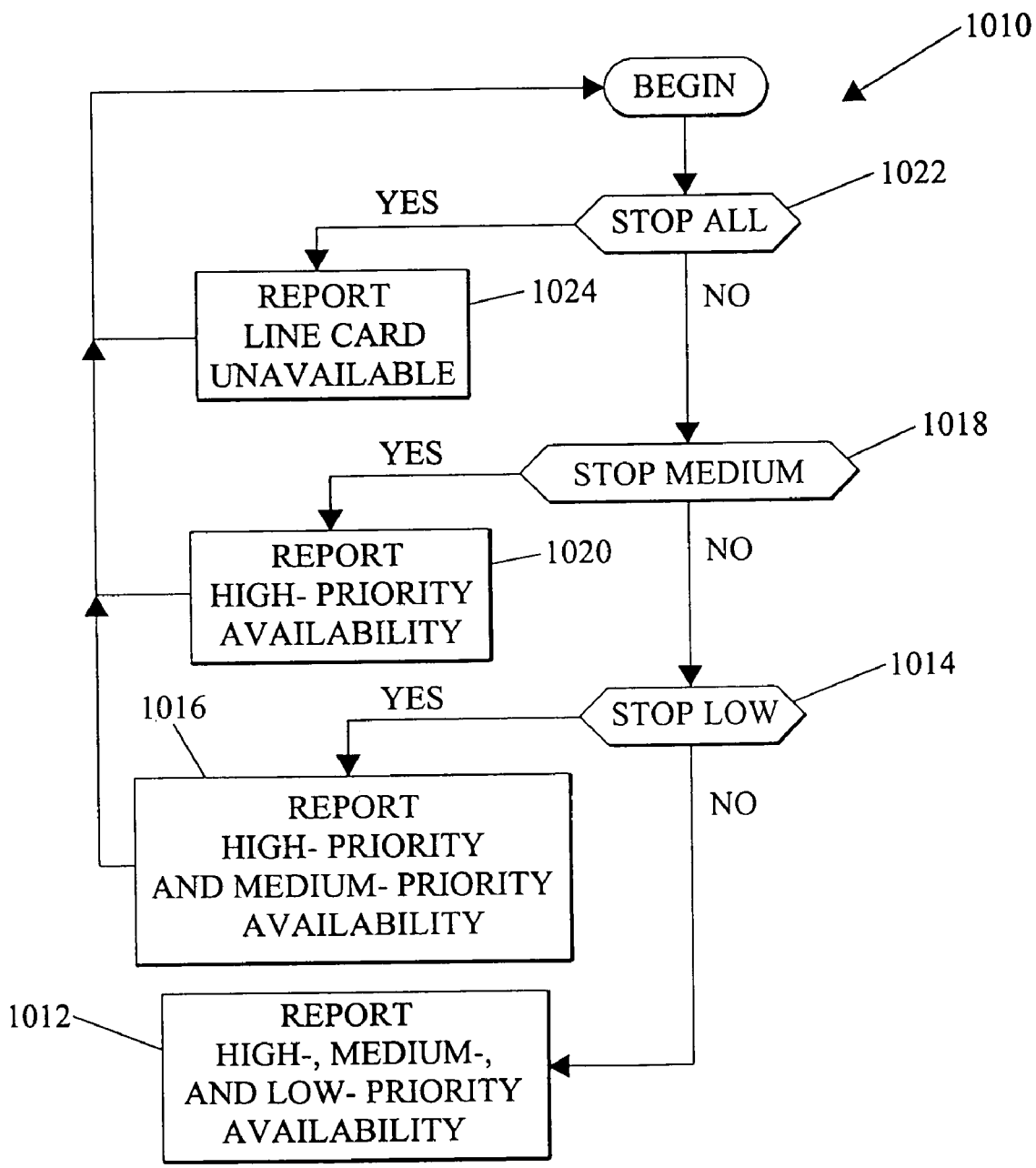

Low-priority queues, such as queue 910 depicted in FIG. 9B, the operation of which is illustrated in flow-chart 1010 of FIG. 10A, can include three watermarks 918, 920 and 922. As shown at 1012, queue 910 reports a status of "Stop-None" in range 912. As shown at 1014 and 101B, it reports a status of "Stop-Low" in range 914. As shown at 1018 and 1020, it reports a status of "Stop-Medium" in range 916, and as shown at 1022 and 1024, queue 910 reports a status of "Stop-All" subsequent to reaching watermark 918.

High-priority queues, such as queue 900, enable associated line cards to pass low- and medium-priority traffic, while not allowing low-priority traffic of one line card to strangle medium-priority traffic of a different line card.

Low-priority queues, such as queue 910, enable associated line cards to pass low-, medium- and high-priority traffic, while not allowing low-priority and medium-priority traffic of one line card to strangle high-priority traffic of a different line card. It also prevents low-priority traffic of one line card from strangling medium- and high-priority traffic of a different line card.

To efficiently manage information of differing priorities, the dual-port RAM 730 preferably provides storage for sixty-four low-priority unicast queues; one for each possible local line card in the communication node 100. The RAM 730 also provides storage for sixteen high-priority unicast queues; one for each line card of its local interconnect module, one for each potential additional local interconnect module, and one extra queue. Multicast traffic, preferably employs four low-priority and four high-priority queues.

Additionally, each plane of the expanded interconnect 134 employs eight high-priority unicast queues; one for each potential local interconnect module 118–132. Each expanded interconnect logical plane also employs eight high-priority and eight low-priority multicast queues; again, one for each potential local interconnect destination module 118–132.

A related component, the queue depth logic circuitry 746, maintains a status of all of the line cards 202–216 of local module 102. The status provides information regarding the availability of each line card 202–216 to receive information of varying priority levels.

Another feature of the illustrated embodiment of the invention is the way in which the node 100 passes the flow control status (sometimes referred to as back pressure status) between the expanded interconnect module 134 and each of the line cards of the local interconnect modules 118–132. According to one preferred embodiment, the invention utilizes bits of the information cell, previously reserved for the destination address. These bits are indicated in TABLE 1 as the "Flow Control" words on the b-channels.

Flow control information is passed between the local interconnect modules 118–132 and the expanded interconnect module 134 using the least significant word of the b-channel. These bits are included in the parity calculation of the parity bit in the primary channel's destination address word. This format is generally illustrated above in TABLE 1, with respect to local interconnect plane 218a word 0, and local interconnect plane 218b word 0. This flow information is preferably not repeated on all links. As illustrated in TABLE 9 below, also with reference to local interconnect planes 218a and 218b and expanded interconnect board 136, flow control information is sent in a two-cell sequence.

More particularly, column 1 of TABLE 9 lists the expanded interconnect port in (ASIC reference designation, ASIC port designation) format. Column 2 lists the port reference designations for local interconnect plane 218b. Type 0 and Type 1 identifies the information contained in the byte (e.g. if local interconnect port 8b receives a Type 0 byte, that byte contains Low6, Low5, Low4, Low3, Low2, Low1 and Low 0 flow control information). Each of the Low0–Low63 bits are set if the corresponding low-priority queue is not full and thus, can receive data. Similarly, the High0–High7, MCHigh, and MCLow bids are set if the corresponding high-priority, multicast high-priority and multicast low-priority queues have space available for receiving information.

TABLE 9

| Exp. Interconnect Port | Local Interconnect Port | D7 | D6 | D5 | D4 | D3 | D2 | D1 | D0 |
|---|---|---|---|---|---|---|---|---|---|
| 402b,0 | 8b | Type0 | Low6 | Low5 | Low4 | Low3 | Low2 | Low1 | Low0 |
| 404b,0 | 9b | Type0 | Low13 | Low12 | Low11 | Low10 | Low9 | Low8 | Low7 |
| 406b,0 | 10b | Type0 | Low20 | Low19 | Low18 | Low17 | Low16 | Low15 | Low14 |
| 408b,0 | 11b | Type0 | Low27 | Low26 | Low25 | Low24 | Low23 | Low22 | Low21 |
| 402b,8 | 12b | Type0 | Low34 | Low33 | Low32 | Low31 | Low30 | Low29 | Low28 |
| 404b,8 | 13b | Type0 | Low41 | Low40 | Low39 | Low38 | Low37 | Low36 | Low35 |

TABLE 9-continued

| Exp. Interconnect Port | Local Interconnect Port | D7 | D6 | D5 | D4 | D3 | D2 | D1 | D0 |
|---|---|---|---|---|---|---|---|---|---|
| 406b,8 | 14b | Type0 | High0 | Low47 | Low46 | Low45 | Low44 | Low43 | Low42 |
| 408b,8 | 15b | Type0 | High7 | High6 | High5 | High4 | High3 | High2 | High1 |
| 402b,0 | 8b | Type1 | Low52 | Low51 | Low50 | Low49 | Low48 | MCHigh | MCLow |
| 404b,0 | 9b | Type1 | Low57 | Low56 | Low55 | Low54 | Low53 | MCHigh | MCLow |
| 406b,0 | 10b | Type1 | Low62 | Low61 | Low60 | Low59 | Low58 | MCHigh | MCLow |
| 408b,0 | 11b | Type1 | Low3 | Low2 | Low1 | Low0 | Low63 | MCHigh | MCLow |
| 402b,8 | 12b | Type1 | Low10 | Low9 | Low8 | Low7 | Low6 | Low5 | Low4 |
| 404b,8 | 13b | Type1 | Low17 | Low16 | Low15 | Low14 | Low13 | Low12 | Low11 |
| 406b,8 | 14b | Type1 | High0 | Low23 | Low22 | Low21 | Low20 | Low19 | Low18 |
| 408b,8 | 15 | Type1 | High7 | High6 | High5 | High4 | High3 | High2 | High1 |

Even though the high-priority, and some of the low-priority flow-control information is repeated on both cycles, there may nevertheless be some associated latency. Thus, to avoid queue overflow, the watermark levels are programmed at a level that takes into account potential latency. By way of example, if flow control latency takes four cells to stop incoming information, (4*16)–4 locations should be reserved above the watermark to avoid overflow. This results from each of sixteen local input ports potentially aiming at the queue for four cell times. Thus, it would be draining out four information cells in that interval. In contrast, the space below the watermark level need only be (1*flow control latency) to avoid underflow. As a result, a preferred embodiment sets the watermark threshold levels between twelve and eighteen bytes out of one hundred and ninety-two bytes.

According to the above-discussed structures and protocols, the interconnect networks support Constant Bit Rate (CBR), Variable Bit Rate-Real-Time (VBR-rt), Variable Bit Rate-Non-Real-Time (VBR-nrt), and Unspecified Bit Rate (UBR) QoS categories. The interconnect networks can operate as a class-based ATM switch. Thus, traffic is queued for transfer based on the service category of the virtual circuit. However, shaping and policing are performed on a per-virtual-circuit basis. The interconnect networks also support QoS features for IP networks, such as the Differentiated Services Model.

As also mentioned above, a preferred embodiment of the invention employs "clumping" to increase the rate with which information can be transferred through the interconnect networks. Typically, in prior art systems, portions of communications can pass through an interconnect network at varying speeds, thus arriving at a common destination in a misordered fashion. Reordering information subsequent to transfer can waste valuable time, and has the potential for receiving out of order cells.

Therefore, according to a preferred embodiment of the invention, the expanded interconnect network 134 includes elements for "clumping" or combining a plurality of information cells and for transferring the clumped cells substantially simultaneously.

More particularly, the queue depth logic 746 detects when a group of four unicast information cells are available in a single queue. In response to detecting four unicast cells in a single queue, the queue depth logic 746 signals the dual-port RAM 731 working in conjunction with the destination stack 740 to transfer the detected four cell clump to shift and hold registers 726 for substantially simultaneous transfer via Ethernet transceivers 708. With the clump of cells being transferred together, they arrive at a destination within a close enough time proximity to avoid reordering.

According to a further embodiment, a programmable wait timer begins decrementing upon the arrival of a first information cell to be included in the clump. If the timer expires prior to the complete formation of a clump, it triggers the cell(s) ready to be sent to be combined with 4-N invalid cells, where N is the number of cells which the clump is lacking.

Multicast cells are clumped together across paths. When multicast traffic is available to be sent on at least four different paths, it is considered available for transmission. As in the case of unicast traffic, a programmable wait timer on any given multicast queue can artificially render multicast traffic eligible. A programmable watermark threshold on multicast queues can also artificially render multicast traffic eligible. Whenever multicast traffic is eligible to be sent, "QInfo" cells are sent on the remaining links to or from the expanded interconnect 134.

The ASIC 224 also includes a translation memory 748. The translation memory 748 provides storage for path segments through the expanded interconnect module 118, if such a module is included in the system. In the case of a node configured as shown in FIG. 2, translation memory 748 preferably contains nine logical storage areas; one for each local interconnect modules 102–116, and one for the expanded interconnect module 118. The expanded interconnect storage area is configured as a bitmap of destination line cards and priority. Destination address circuitry 750 accesses the translation memory 748, and the multicast bitmap register 752 receives the accessed information.

A feature of the invention is synchronization of the local interconnect boards of a particular local interconnect module with each other, and the synchronization of the expanded interconnect boards 138–140 with each other. Since each board is independent, although they derive their clock frequencies from the same source, some signals are employed to establish and maintain synchronization between boards. Slot synchronization forces essentially identical "time zero" references between boards, and thus planes, in a module. Cell synchronization enables a local interconnect module to set its slot zero reference such that its transmitted information cells can arrive at the expanded interconnect 134 at a safe time. CPU synchronization enables certain CPU write operations to take place at the same time on all planes in a module.

Plane synchronization logic 752 provide signals 754 necessary to synchronize certain read and write operations between each plane of local interconnect module 118. Control registers 758 provide flow control information by way of lines 760 to the other planes of local interconnect 118, if operating in local mode, or the additional expanded interconnect planes of module 134 if operating in expanded mode.

Plane to plane cell synchronization is attained by cellok inter-plane connections 761. An asserted cellok signal 761 indicates that the corresponding plane has received a valid and error free cell header containing the 2-byte destination address. According to the illustrated embodiment, each plane outputs 16 cellok signals 761 and inputs 32 cellok signals 761. Each cellok output, N, represents that both the a-ports and the b-ports have valid cell headers.

For a cell to be forwarded, all operating planes assert their respective cellok signals 761. If one plane asserts cellok signals 761 and other planes do not, errors are recorded in CPU addressable registers 758. If a plane fails, the system has the capability of instructing the operating planes to ignore the failed plane. In this way, a single failed plain does not reduce the rate with which the effected local or expanded interconnect can transfer information.

Substantially identical ASICs are employed in the local interconnect modules 118–132 and the expanded interconnect module 134. To that end, ASIC 224 includes mode select 756 for selecting whether ASIC 224 is to operate as a local interconnection circuit or as an expanded interconnection circuit. As shown in FIGS. 3 and 5, in local mode, ports 0a–7a and 0b–7b connect to local line cards and ports 8a–15a and 8b–15b connect to expanded interconnect 134. Alternatively, in expanded mode all ports 0a–15a and 0b–15b connect to local interconnect planes, such as 218–222 shown in FIG. 5.

Referring again to FIG. 8, an important feature of the illustrated ASIC 224 is a "slot counter" contained in timers, counters, control registers 758. The slot counter repeatedly counts from 0–15. Each port 01–15a and 0b–15b is assigned a slot count. Each time the slot count 0–15 matches a port number, a check is performed to determine if there is a cell to be transmitted out that port. If there is, the cell is copied from RAM 730 to shift and hold register 718 or 726 for transmission. If there is no cell to be transmitted, then a flow control cell is transmitted. According to the illustrated embodiment, a common slot counter is employed for the a-ports and the b-ports.

As mentioned above, board 218 also includes controller 712 and memory 710. Memory 710 stores the control code for board 218. As such, it provides start up initialization of statuses, pointers and communication interfaces. Controller 712 provides a variety of conventional processor functions.

As in the case of the local interconnect boards, expanded interconnect boards divide logically into essentially identical a- and p-planes. Thus, for illustrative purposes, FIG. 11 is described in terms of the a-plane 136a of expanded interconnect board 136 of FIG. 5.

Plane 136a includes four ASICs 402a, 404a, 406a and 408a. ASICs 402a–408a are essentially identical to ASIC 224 of FIG. 8. Each ASIC 402a–408a controls sixteen Gigabit Ethernet ports 1102–1108. Ports 1102–1108 couple to ASICs 402a–408a by way of shift and hold registers, such as registers 714 and 718 of FIG. 8. Bus 110 couples interplane control signals, such as those generated by counters, timers and registers 758 and plane synchronization logic 753, to each ASIC 402a–408a. Processor 1114 controls ASICS 402a–408a by way of bus 1112. Processor 1114 includes a CPU module, DRAM, FPGA control and Ethernet control, much in the same way that memory 710, controller 712 and control and status registers 753 provide these functions for local interconnect board 218.

It should be noted that connections and circuit divisions referred to in the above description may be representative of both actual and logical connections or divisions.

Figure 11:
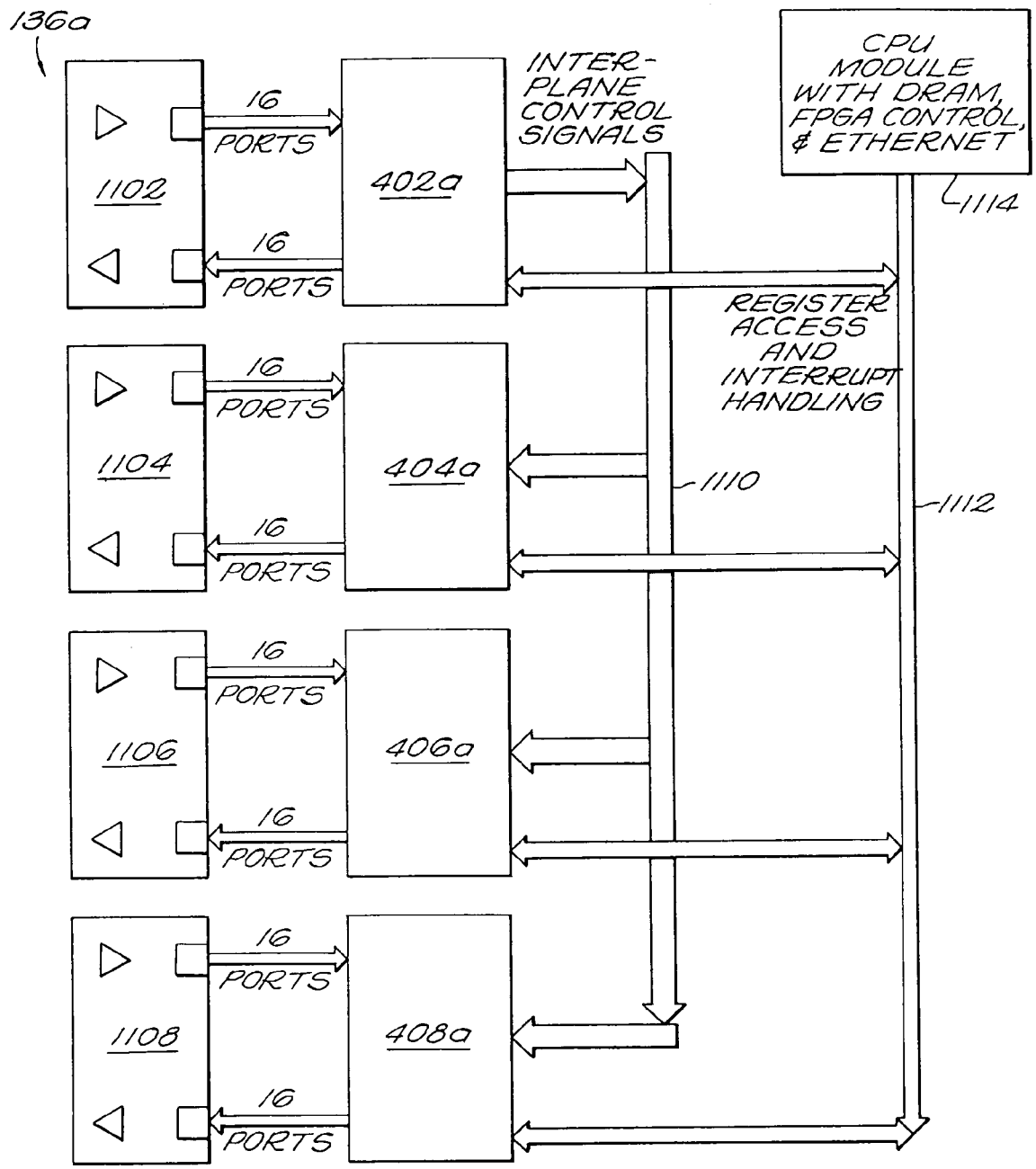
FIG. 11 is functional block diagram of an expanded interconnect logical plane of the type depicted in FIG. 5.

FIG. 11 shows a functional block diagram of a typical expanded interconnect logical plane illustrative of any of interconnect planes of FIG. 4.

It will thus be seen that the invention efficiently attains the objects set forth above, including providing dynamically bandwidth scalable interconnect network. Since certain changes may be made in the above constructions and the described methods without departing from the scope of the invention, it is intended that all matter contained in the above description or shown in the accompanying drawings be interpreted as illustrative and not in a limiting sense.

Having described the invention, what is claimed as new and protected by Letters Patent is:

1. An interconnect network for operation within a communication node, said network comprising:
   a plurality of local line card modules configured to process information received at a plurality of speeds and formatted according to a plurality of protocols,
   a selectable number of local interconnect modules connected to the local line card modules and located proximate to each other and each including local transfer elements for transferring information between a plurality of local I/O channels and for transferring information between said plurality of local I/O channels and a plurality of non-local I/O channels, and
   an expanded interconnect module located proximate to said local interconnect modules and including coupling means for electrically coupling to said non-local I/O channels, and expanded transfer elements for transferring information between said local interconnect modules.

2. An interconnect network according to claim 1 wherein said local transfer elements include means for synchronizing information transferred between each of said local transfer elements.

3. An interconnect network according to claim 1 wherein said expanded transfer elements include means for synchronizing information transferred between said local interconnect modules.

4. An interconnect network according to claim 1 further comprising hot-swap means for changing the selected number of said local interconnect modules included in said interconnect network, while said interconnect network is transferring information.

5. An interconnect network according to claim 1, wherein said local I/O channels have an associated priority and said interconnect network further comprises QoS means for transferring information from one of said local I/O channels having a relatively higher priority in preference to transferring information from one of said local I/O channels having a relatively lower priority.

6. An interconnect network according to claim 1, wherein said local I/O channels have an associated availability for receiving information, and said interconnect network further comprises, status means for maintaining a status indicative of said associated availability for one or more of said local I/O channels, and back pressure means for communicating said status out of said local I/O channels.

7. An interconnect network according to claim 6, wherein said local interconnect modules further include a plurality of memory queues, said plurality of local I/O channels having associated memory queues, and said memory queues having means for storing information received by way of an associated local I/O channel.

8. An interconnect network according to claim 7 further comprising means for setting said status corresponding to a particular one of said local I/O channels to indicate unavailability for receiving information in response to said associated queue of said particular local I/O channel reaching a selectable content level.

9. An interconnect network according to claim 7, wherein information coupled into and out of said network has an associated priority, and said network further comprises means for setting said status corresponding to a particular one of said local I/O channels to indicate unavailability for receiving information having a particular priority, in response to said associated queue reaching a selectable content level.

10. An interconnect network according to claim 6, wherein information transferred through said interconnect modules includes a data portion and a destination address portion, said destination address portion specifying through which one of said local I/O channels said information is to be transferred out of said interconnect network, and said back pressure means is adapted for replacing said destination address portion with said status for communicating said status out of said interconnect network.

11. An interconnect network according to claim 1 further comprising redundancy generating means for generating an alternative version of information being transferred out of said interconnect network through said local I/O channels.

12. An interconnect network according to claim 11, wherein said interconnect network is adapted for transferring information as information cells, each of said cells including groups of information words, and wherein said redundancy generating means is adapted for causing said alternative version of said information to be a bit-by-bit "exclusive-or" between pairs of said groups of information words included in an information cell.

13. An interconnect network according to claim 1, wherein said interconnect network is adapted for transferring information as information cells, and said local transfer elements further include means for substantially simultaneously transferring a plurality of said information cells out of said local interconnect modules.

14. An interconnect network according to claim 13 further comprising a memory queue for intermediately storing said plurality of information cells to be transferred, and queue detection means for detecting when a selected number of said information cells are stored in said memory queue, wherein said local transfer elements are adapted for transferring said plurality of information cells in response to said queue detection means detecting storing of said selected number of said information cells.

15. An interconnect network according to claim 1, wherein said interconnect network is adapted for transferring information as information cells, and said expanded transfer elements further include means for substantially simultaneously transferring a plurality of said information cells out of said expanded interconnect module.

16. An interconnect network according to claim 15 further comprising a memory queue for intermediately storing said plurality of information cells to be transferred, and queue detection means for detecting when a selected number of said information cells are stored in said memory queue, wherein said expanded transfer elements are adapted for transferring said plurality of information cells in response to said queue detection means detecting storage of said selected number of said information cells.

17. An interconnect network according to claim 1, wherein said local I/O channels have associated destination addresses, and said expanded interconnect module includes:
array means for storing path information representative of a plurality of paths through said expanded transfer elements over which information from a first local I/O channel of one of said local interconnect modules can be transferred to a second local I/O channel of another one of said local interconnect modules, and
index means for selecting appropriate path information from said array means, at least partially in response to a destination address of said second local I/O channel.

18. An interconnect network according to claim 1, wherein said local transfer elements and said expanded transfer elements are substantially identical.

19. An interconnect network according to claim 18, wherein said local and said expanded transfer elements each includes mode control means for selecting whether said transfer element is to be employed in one of said local interconnect modules or in said expanded interconnect module.

20. An interconnect network for operation within a communication node, said network comprising:
a selectable number of local interconnect modules each including local transfer elements for transferring information between a plurality of local I/O channels and for transferring information between said plurality of local I/O channels and a plurality of non-local I/O channels, wherein said interconnect network is adapted for transferring information as information cells, each of said cells including groups of information words,
an expanded interconnect module including coupling means for electrically coupling to said non-local I/O channels, and expanded transfer elements for transferring information between said local interconnect modules, and
redundancy generating means for generating an alternative version of information being transferred out of said interconnect network by generating a bit-by-bit "exclusive-or" between pairs of said groups of information words included in an information cell.

21. An interconnect network for operation within a communication node, said network comprising:
a selectable number of local interconnect modules each including local transfer elements for transferring information between a plurality of local I/O channels and for transferring information between said plurality of local I/O channels and a plurality of non-local I/O channels,
an expanded interconnect module including coupling means for electrically coupling to said non-local I/O channels, and expanded transfer elements for transferring information between said local interconnect modules, and
quality of service means for differentiating between information coupled into said local I/O channels based on an associated priority of said information, and for indicating unavailability for receiving information having a particular associated priority on one or more of said local I/O channels.

22. An interconnect network for operation within a communication node, said network comprising:
a selectable number of local interconnect modules each including local transfer elements for transferring information between a plurality of local I/O channels and for transferring information between said plurality of local I/O channels and a plurality of non-local I/O channels, and at least one expanded interconnect module including coupling means for electrically coupling to said non-local I/O channels, and expanded transfer elements for transferring information between said local interconnect modules, wherein said interconnect network is adapted for transferring information as information cells, and said local and expanded transfer elements further include clumping means for substantially simultaneously transferring a plurality of said information cells.

23. A dynamically bandwidth scalable communication node comprising:
- a selectable number of local communication modules within the communication node that provide dynamic bandwidth scalability to the communication node, each of said local communication modules including a plurality of external communication channels for coupling information into and out of said node, a plurality of internal communication channels for coupling information within said node, and means for coupling information between said external communication channels and said internal communication channels,
- a local interconnect module within the communication node, associated with each of said selectable number of local communication modules, and including local transfer elements for transferring information between said plurality of internal communication channels of said associated local communication module, and
- an expanded interconnect module within the communication node, including means for coupling to each of said local interconnect modules, and expanded transfer elements for transferring information between said local interconnect modules, thereby enabling transfer of information between external communication channels of different ones of said selectable number of local communication modules.

24. A dynamically bandwidth scalable communication node having a modular construction and comprising:
- a selectable number of local communication modules within the communication node that provide dynamic bandwidth scalability to the communication node, each of the local communication modules including a plurality of communication channels for transferring information into and out of said node,
- a local interconnect module within the communication node and coupled to each of said local communication modules and including local transfer elements for transferring information between said plurality of communication channels, and
- an expanded interconnect module within the communication node and including elements for coupling to a plurality of said local interconnect modules, and transfer elements for transferring information between said plurality of local interconnect modules, wherein information can be transferred between communication channels of different ones of said local communication modules.

25. A method for transferring information signals between I/O channels of an interconnect network adapted for operation in a communication node, said method comprising:
- coupling information to I/O channels of one or more local interconnect modules proximately located within the communication node,
- transferring information between I/O channels of a particular one of the local interconnect modules in response to a local destination address,
- transferring information from one of said local interconnect modules to an I/O channel of an expanded interconnect module proximately located within the communication node in response to a non-local destination address,
- transferring information from said expanded interconnect module to another particular one of said local interconnect modules in response to said non-local destination address, and
- scaling bandwidth of said interconnect network by including a selectable number of said local interconnect modules in said plurality of local interconnect modules.

* * * * *